(12) United States Patent
Jordan

(10) Patent No.: US 7,236,680 B1
(45) Date of Patent: Jun. 26, 2007

(54) ALIGNING APPARATUS AND METHOD USING ON-THE-FLY DETERMINATION OF THROUGHPUT-PROFILE GRADIENT FOR CURRENT POSITIONING OF RADIATED INFLUENCE SUPPLIER AND/OR RECEIVER

(75) Inventor: Scott C. Jordan, San Jose, CA (US)

(73) Assignee: Pi (Physik Instrumente) L.P., Auburn, MA (US)

( * ) Notice: Subject to any disclaimer, the term of this patent is extended or adjusted under 35 U.S.C. 154(b) by 261 days.

(21) Appl. No.: 10/919,694

(22) Filed: Aug. 16, 2004

(51) Int. Cl.
*G02B 27/00* (2006.01)
(52) U.S. Cl. ............................ 385/147; 385/49; 385/52
(58) Field of Classification Search ................ 385/147, 385/49, 52
See application file for complete search history.

(56) References Cited

U.S. PATENT DOCUMENTS

| | | | | |
|---|---|---|---|---|
| 4,708,483 A | * | 11/1987 | Lorenz | ......................... 356/602 |
| 4,720,163 A | * | 1/1988 | Goodwin et al. | .............. 385/90 |
| 5,278,934 A | | 1/1994 | Jordan | |
| 5,384,870 A | * | 1/1995 | Lieber | .......................... 385/15 |
| 5,926,594 A | * | 7/1999 | Song et al. | ..................... 385/49 |

OTHER PUBLICATIONS

Physic Instrumente: "F-603 Light Line Operating Manual", Jan. 12, 1994, pp. 19-22.

* cited by examiner

*Primary Examiner*—Frank G. Font
*Assistant Examiner*—James P. Hughes
(74) *Attorney, Agent, or Firm*—MacPherson Kwok Chen & Heid LLP; Gideon Gimlan

(57) ABSTRACT

Samples are taken of radiation throughput intensities while a radiation supplying, first element advances along a dithering displacement path, where the displacement path is spaced slightly away from but extends adjacent to an initial position of the first element and while a reference radiation signal is coupled radiatively between the first element and a counterpart, radiation receiving, second element. Those samples that are seen to be the greatest ($I_{maxc}$) are identified. From this information, a determination is made of at least the approximate direction, if not the approximate length of an optimization vector which separates the initial position of the first element from a radiative coupling, new position having a greater coupling efficiency. The first element is automatically moved according to the optimization vector so as to be at or substantially close to the new radiative coupling position.

22 Claims, 7 Drawing Sheets

400

500

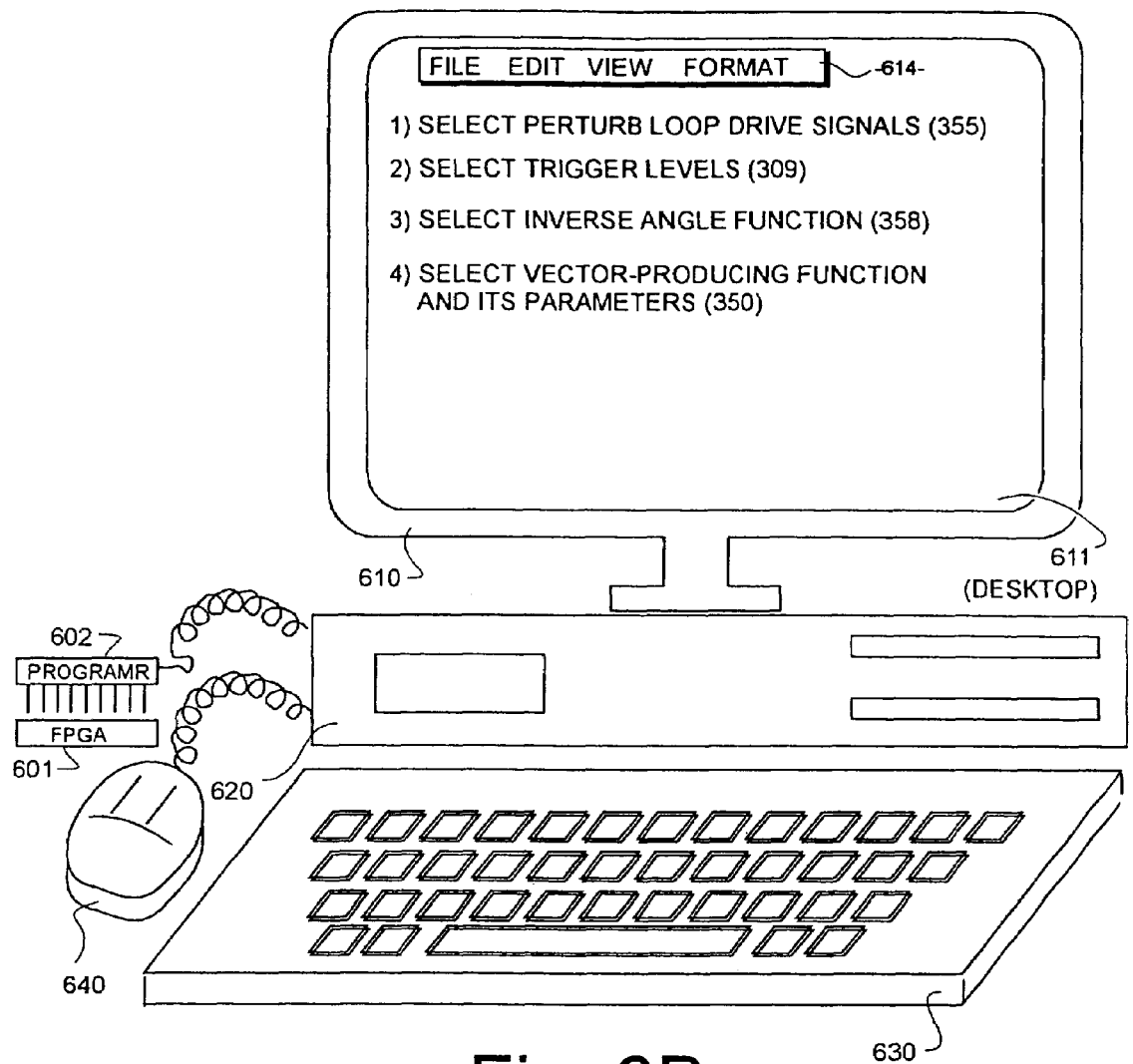
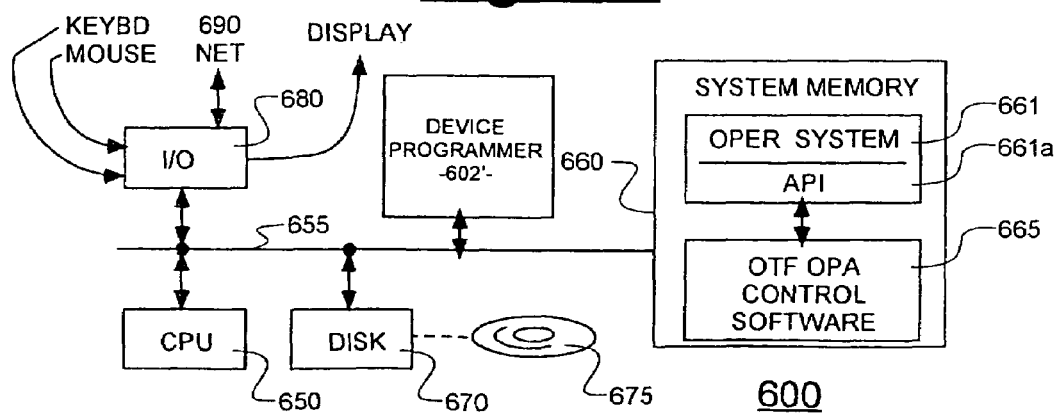

ALIGNING APPARATUS AND METHOD USING ON-THE-FLY DETERMINATION OF THROUGHPUT-PROFILE GRADIENT FOR CURRENT POSITIONING OF RADIATED INFLUENCE SUPPLIER AND/OR RECEIVER

1. FIELD OF DISCLOSURE

The present disclosure of invention relates generally to the art of aligning, pre-aligning and/or maintaining alignment between a movable one or more of radiative influence devices such as photonic or other radiation supplying devices and/or radiation receiving devices and/or radiation guiding trains so as to enhance radiative influence coupling between such devices and their counterparts.

The disclosure relates more specifically to a digitized, gradient determining method for use within an apparatus that finds and, and where desired, repeatedly updates its alignment to, and/or its prediction of how to reach, a peak coupling state, where that peak coupling state may occur within a radiative influence throughput-profile associated with a movable one or a movable set of radiative influence devices such as photonic or other radiation supplying and/or receiving devices.

2A. CROSS REFERENCE TO PATENTS

The disclosure of the following U.S. patents is incorporated herein by reference:

(A) U.S. Pat. No. 5,278,934, issued Jan. 11, 1994 to Scott Jordan, and entitled "Throughput Maximizing Systems for Substantially Unimodal Throughput Profiles".

2B. CROSS REFERENCE TO RELATED OTHER PUBLICATIONS

The following publications are cited here for purposes of reference:

(A) Physik Instrumente F-603 Light Line Operating Manual, Jan. 12, 1994;

(B) T. Edye et al., "Automatic Alignment Station for Single or Multimode Optical Fibers", SPIE vol. 483, Optical Alignment II (1984), pp. 65 to 69.

(C) T. Edye et al, "Automatic Assembling Station for Guided Optic Components", SPIE vol. 483, Optical Alignment II (1984), pp. 70 to 75.

(D) John C. Goodwin, "Dynamic Alignment of Small Optical Components" Journal of Lightwave Technology, vol. LT-5, January 1987, pp. 97 to 101.

(E) Nanotrak Brochure, by Photon Control Limited Feb. 26, 1991.

3. DESCRIPTION OF RELATED ART

Radiative influence can occur between many kinds of devices, including, but not limited to, between (a) spaced-apart, optically-coupled devices; (b) spaced-apart, magnetically-coupled devices; and (c) spaced-apart, atomic-force-wise coupled devices. The achievement of a desired kind of alignment between spaced-apart but radiative influence-wise coupled devices can be a problem because of the sensitivity of some radiative influence-wise coupled devices to slight amounts of misalignment and because of the potentially large number of axes of movement (i.e., transverse axes and pivot points) which may be present and which may need servo control in order to maintain a desired kind of alignment.

Consider as a first, and hypothetically idealized example, the case of two essentially identical light guides, A and B, where each has a finite length, and where respective first ends of the two light guides are to be brought close to one another without solid contact being established directly or indirectly between those first ends. Assume that each of the idealized light guides (A and B, not shown in the drawings) has a same, cylindrically-shaped light-conducting core of a same radius and that the core of each guide extends along the length of the guide (along a respective and mostly-internal, $z_A$ or $z_B$ axis of the A or B guide), almost up to its respective first end. At the respective first end of each of these guide there is an idealized convex lens having a perfect focal point located some distance, $d_z$ beyond the end of the guide and along the respective and mostly-internal and central, z-axis of the guide. The light-conducting core of each guide (A and B) is to be filled with many separate beams of photonic energy all traveling generally parallel to the longitudinal, central axis (the respective and mostly-internal, z-axis) of its cylindrical shape by means of total internal reflection or otherwise. When the multiple beams of photonic energy (each beam is assumed to have a near-zero width) pass through the convex lens at the guide's terminus, they all converge through the distal focal point at distance, $d_z$ beyond the end of the respective guide (A or B). Assume further that it is desired to radiatively couple all the beams traveling in guide A into the spaced-apart guide B, this occurring with maximum coupling efficiency and such that the radiatively coupled beams in guide B will fill up its internal core in essentially the same way that they filled the internal core of guide A.

Speaking from a purely mathematical viewpoint, one solution may be obtained with use of simple symmetry. One merely has to line up the $z_A$ axis of guide A with the $z_B$ axis of guide B and to space the guides apart perfectly by the distance $2 \cdot d_z$ so as to thereby define two conically-shaped zones of beam-convergence that intersect at their apexes, where the apex of each is at the corresponding focal distance, $d_z$ away from the end of its respective light guide. The multiple beams of light that enter from the interior of guide A, into the end-lens of guide A, will converge externally at the common focal point which is located distance $d_z$ away. As they travel beyond the external focal point, they will diverge symmetrically on their way to encountering the respective end-lens of guide B. There, they will be re-directed into counterpart parallel paths filling the core of guide B. This is very easy to picture: two cone-tipped cylindrical regions facing each other and touching tip to tip.

In the real world, it is an entirely different matter to carry out something of this nature, especially when either or both of the lens-capped guides is free to move relative to the other and about, or along, any of a large number of available degrees of freedom. If guide A pinions in any way, relative to guide B in 3-dimensional space, then their respective $z_A$ and $z_B$ axes will no longer be in line and their respective focal points may no longer overlap perfectly. Radiative coupling between the two, misaligned guides will generally degrade to less than the desired optimal. If guide A shifts slightly along either or both of its respective, $x_A$ and $y_b$ axes (both being orthogonal to the $z_A$ longitudinal axis) and this happens while guide B stands relatively still, then the respective $z_A$ and $z_B$ axes of the guides will no longer be in line and their respective focal points will no longer overlap perfectly. Radiative coupling between the two, misaligned guides will generally, once again, degrade to a less than optimal state. If guide A advances or recedes slightly along its respective $z_A$ axis while guide B stands relatively still, then the respective focal points of guides A and B will no longer overlap perfectly and the desired pattern of light beams may no longer appear in the receiving guide, B. In order to prevent or minimize the pinioning, shifting, and/or advancement and rescission of the A and B guides relative to one another, a large number of complex and highly precise servo control mechanisms may need to be deployed. This can be a significant problem in many situations, particularly where space is tight.

In terms of more realistic examples, consider that it is often desirable to maximize (or minimize) energy coupling between two or more, small-sized and radiatively cross-influencing devices such as photonic or other radiation supplying and/or receiving devices by moving one or more of those devices in such a manner that power is conserved and/or that signals can be usefully exchanged between the devices and/or that a desired form of physical alignment can be maintained between objects attached to the radiatively cross-influencing devices. (It is within the contemplation of the present disclosure, incidentally, to include not only photonically-coupled devices but also magnetically-coupled devices and other radiative influence devices such as atomic-force microscope stage and tip combinations or the like where physical tracking relationships are to be maintained between a force/influence sensing tip and an on-stage element whose radiative influence is being sensed by the tip.)

Beyond providing a desired kind of physical alignment between plural devices of this type (e.g., an influence maximizing or influence minimizing kind of alignment) it is sometimes desirable to be able to provide the desired kind of physical alignment within a relatively short time frame and/or at minimized cost and/or while using control mechanisms of miniaturized size. Moreover, aside from trying to actually change the relative physical orientations of two or more such, radiative influence devices so as to optimize energy coupling or achieve another like result, it can also be desirable in certain situations to merely determine what movement vector(s) would bring about such desired energy coupling (i.e. within a relatively short time frame), even if the movement is not to be undertaken within a specified, relatively short time frame or ever at all.

By way of a more specific and introductory example, assume that an initially-movable end of an optical fiber is being encapsulated next to, or is being otherwise fixedly-positioned adjacent to a photodiode on a printed circuit board or in another such tight space. Assume further that, during the encapsulating, gluing, welding, soldering, or other position-fixing process, it is desirable to lock the position of the initially-movable end of the fiber at a location relative to a light-receiving and/or light-emitting section of the photodiode so that, when the position-fixing process completes, photonic energy coupling between the fiber and the photodiode will be at or substantially near its maximum possible amount. Additionally or alternatively, assume that during the position-fixing process, it is desirable to maintain the incidence angle of the longitudinal axis of the fiber end relative to a surface of the photodiode at an incidence angle so that, when the position-fixing process completes, photonic energy coupling between the fiber and the photodiode will be at or substantially near its maximum possible value. In other words, prior to and/or during the time the time that the encapsulating or other position-fixing process is proceeding to a steady-state completion, steps may be taken to assure that the fiber and photodiode will be optimally aligned to one another when the steady-state completion is achieved, even if during the position-fixing process they are subject to stresses or strains that urge the fiber and photodiode out of alignment.

More specifically, one popular method for fixedly attaching a wave-guiding fiber to another device is to metallize the fiber and then solder one end of the metallized fiber into position on the other device or on a connecting substrate. As the solder is cooling into its ambient steady-state, thermally-based stresses or strains can try and shift the position of the fiber end. Active alignment may be employed throughout the solder's cooling process to try to keep the fiber end in an optimized, energy-coupling position. Alternatively, experimentation may show that in the interim between reaching a particular temperature above ambient (and/or a given hardness state and/or another alike, pre-ambient state) and its steady-state, the cooling solder will shift the fiber end by a predictable further amount, say +12.34 µm along a pre-defined, Z axis. In such a case, it may be desirable to keep the fiber end at a position that is spaced away from the optimized, energy-coupling position by, in our example, −12.34 µm along the predefined Z axis, to cease active alignment when the cooling solder reaches the identified pre-ambient state, and to let the cooling solder thereafter shift the fiber end into the optimized, energy-coupling position as the solder drifts into its ambient-defined, steady-state. This introductory example does not exclude from the contemplation of the present disclosure, situations where the fiber and photodiode are never fixedly-positioned relative to one another. It is possible to have situations where one moves, the other tries to follow and lock into alignment with the first, and the problem of maintaining optimal alignment is an ongoing one. And of course, during encapsulation in an epoxy or in alike fixations of the to-be-aligned devices, multiple repetitions of the alignment-achieving process may be advisable given that curing stresses or strains can urge the system into drifting out of optimal alignment.

In some circumstances, a manual alignment process may be employed for fixedly positioning the fiber and photodiode together. Precision thumbscrews may be used to move the fiber and/or photodiode by fine increments as an encapsulating epoxy or position-fixing glue cures. A constant level of light may be passed through one of the optical fiber for detection by the photodiode at the opposed end of the fiber. The photodiode may be attached to electrical measurement equipment so that the position where the photodiode detects maximum energy coupling (e.g., maximum intensity) may be found by manual adjustment of the thumbscrews. However, after such an optimal setting for the thumbscrews is first found, that may not be enough to provide the desired end result. Stresses and strains within the curing epoxy/glue may shift the state of the system away from the initially obtained, optimal-coupling condition. Such state-shifting forces and/or distortions may alternatively or additionally be due to thermal mechanisms (e.g., cooling adhesive) and/or other physical change mechanisms and/or ongoing processes. Because of this, the thumbscrews may have to be manually adjusted on a substantially continuous basis as the encapsulating epoxy cures (and/or as another affixing means shifts into steady state) in order to maintain a found level of maximum energy coupling.

Manual adjustment of this kind is tedious and prone to human error. A number of automated methods have been devised as alternatives to the manual approach. One automated method of particular interest is disclosed in the above-cited U.S. Pat. No. 5,278,934. Briefly, in accordance with that patent, one of a pair of radiation supplying and/or receiving devices (e.g., a fiber end or a photodiode) is perturbed slightly away from its original position, and is moved through specific points that are predefined along a prespecified looping motion path, where that prespecified motion path (e.g., a circle, ellipse or polygon) that loops around that original position. In one embodiment of the U.S. Pat. No. 5,278,934 patent, looping path is controlled to be a circle of a prespecified radius (a dither radius) and the specific points around the looping path are uniformly distributed according to angular sweep about the circumference of the circle. For each of the angularly-identified, specific points, a corresponding, intensity-storing location is established in a memory array and used to store intensity data corresponding to its specific point (see col. 2, line 47). More generically, the shape of the looping motion path is controlled to be that of a regular geometric figure such as a circle, an ellipse or a regular polygon. Movement of the perturbed device is controlled to assuredly pass through each, pre-specified, specific point around the fixed-shape loop so that the corresponding passed-through intensity value can be stored in the corresponding intensity-storing location of the memory array. In one possible embodiment, movement and/or vibration of the dithered (perturbed) device would have to be stopped (e.g., allowed to settle to a state of negligible vibration) before a reading could be taken of the absolute or relative intensity of the coupled energy, as detected by the radiation receiver (e.g., the photodiode) where that reading is taken exactly when the dithered device is at steady-state over the pre-specified, specific point on the perturbation circle. The memory array would then store in the corresponding array location, the intensity reading that is respectively taken at the corresponding and pre-specified, specific point around the shape-controlled, perturbation loop (circle). At the end of such precise moving about the perturbation loop (circle) a computer would then analyze the stored intensity readings in the memory array and, based on the controlled shape of the perturbation loop (circle, ellipse, or regular polygon), the computer would use comparison or extrapolation to determine what specific point along the known shape of the perturbation loop would correspond with the maximum intensity value in view of the samples that had been taken at the specific points around the loop. From this determination, the computer would produce an optimization vector which points from the center of the regularly-shaped, perturbation loop towards what is believed to be, the peak of the unimodal throughput-profile of the system. A motor means would then move the perturbed device from its original position, to a new position in accordance with the computer-generated, optimization vector. The direction or angle of the optimization vector would be obtained by first estimating or calculating the slope or gradient of the perturbation loop relative to the intensity throughput profile. This gradient result would be used to identify the direction along the throughput profile that is the most uphill one, and thus the one most likely to be pointing towards the profile peak. The length of the optimization vector would be empirically guessed at based on the maximum and minimum intensity values extrapolated from the samples taken while stepping through the different specific points of the fixed-shape perturbation loop, where such stepping-through includes making certain to take an intensity reading precisely when at each one of the different specific points of the fixed-shape perturbation loop.

In accordance with one embodiment detailed in U.S. Pat. No. 5,278,934, (see source code at cols. 31–32, "allow time for settling") time is wasted waiting for dithering movement to settle at each specific point before an intensity measurement is taken at that point.

In accordance with one embodiment of U.S. Pat. No. 5,278,934, the optimization vector length is calculated as follows after all the specific points around the dither loop are accounted for:

$$d = G \cdot (I_{max} - I_{min})/(I_{min}) \quad \{Eq. 1\}$$

In the given, first equation {Eq. 1}, G is an empirically determined gain value and d is a distance to be traveled from the original center of the perturbation loop toward the estimated peak position of the throughput profile. $I_{max}$ is the maximum intensity value which is determined by comparison of, or extrapolated from the samples taken around the different specific points of the regular perturbation loop, while $I_{min}$ is the similarly resolved, minimum intensity value.

While the methods proposed by U.S. Pat. No. 5,278,934 provide excellent prediction and tracking characteristics, they nonetheless suffer from certain drawbacks. First, because a perturbation loop of fixed shape (e.g., a circle, ellipse or a regular polygon) is to be maintained and intensity observations are to be made precisely when the perturbed part is at (over) one of the "different specific points" on that loop, mechanical system resources have to be provided for maintaining the fixed shape of the perturbation loop and for making sure that throughput intensity is sampled exactly when the perturbed (dithered) part has positionally settled at the one of pre-specified, different points. If a stepping motor is used for discretely stepping to the pre-specified points, then an undesirably large amount of time may elapse between optimization adjustments because of the repeated step and pause-into-settled-state cycles that the stepping motor will go through for each pre-specified point around the fixed-shape perturbation loop (e.g., polygon). Even if analog motion control is used, the system may have to wait for its various moving mechanical parts to settle into specific states in order to assure that the fixed shape of the perturbation loop is maintained and that the intensity observations are made exactly when at the pre-specified, different points of the perturbation loop.

In addition to the burden which is placed on mechanical resources of the system by the above aspects, further burdens may be associated with the cost and/or size of the memory array and computer which respectively are used for storing the intensity observations at the pre-specified points of the perturbation loop and which are used for analyzing array contents and calculating therefrom the angle and length of the optimization vector. The size of the intensities-storing array grows as the number of specific points around the loop increases and as the precision of intensity-reading at each point increases. Such burdens on computational resources may be unacceptably large in certain situations. Consider by way of example and for the purposes of visually understanding the scope of this problem, a large factory with thousands of alignment stations, where each such station has its own discrete, step-and-stop platform for moving a respective perturbed part according to a fixed-shape perturbation loop, and where each station has its own memory array for storing the intensity observations made at the pre-specified points on the fixed-shape loop of that station, and where each such station yet further has a link to, or its own associated computer which reads the array contents, analyzes them, generates a corresponding optimization vector, and sends the corresponding optimization movement commands to the step-and-stop platform. Such a hypothetical factory may require use of costly and/or bulky computers and/or may consume so much space and/or energy that its operation becomes uneconomical.

It is desirable to provide an alignment system which has the beneficial characteristics of the alignment optimization system disclosed in U.S. Pat. No. 5,278,934 but without at least some of the above mentioned drawbacks.

SUMMARY

Structures and methods may be provided in accordance with the present disclosure of invention for overcoming one or more of the above-described problems (A) More specifically, in accordance with one aspect of the present disclosure, a perturbation-type looping motion (or more generally, one or more, dithering displacement motions) may be used for determining a difference relationship between a current optical/radiation alignment configuration (or other radiative influence configuration) and a desired optical/radiation alignment configuration (e.g., an energy-coupling optimizing alignment or another desired radiative influence configuration) where such dithering displacement motion or motions do not need to have: (1) a specific, fixed-shape and/or (2) intensity observations being made at specific points along the dithering displacement motion(s) and/or (3) discrete stops being made at such specific points on the paths traced out by the dithering displacement motion(s). Instead, intensity/influence observations (samplings) can be opportunistically made even randomly and/or on-the-fly (OTF) as one or more, of plural radiation supplying and/or receiving devices (or influence-creating and influence-detecting elements) are moved (asynchronously or synchronously or in spurts of both) along almost-arbitrarily definable, dithering displacement paths. In accordance with a sub-aspect of this, the utilized dithering displacement motion is a natural perturbation loop motion which is natural to (resonantly conformed to by) the mechanical systems that movably support one or more of the radiation supplying and/or receiving devices (or influence-creating and influence-detecting elements).

In embodiments where the dithering displacement motion is a continuous, and preferably-natural, perturbation loop, the shape of the dithering displacement path can be elliptical or circular or otherwise (e.g., cloverleaf, Lissajous pattern, etc.) as may substantially and naturally conform with the mechanically natural oscillation modes of the perturbed mechanical system. Partially or fully non-natural dithering displacement motion are also within the scope of this disclosure. Each intensity observation (or other magnitude-of-influence detection) may be made on-the-fly, at a convenient and/or randomly selected point in time along the path of the displacement motion rather than being forced to occur at a time point that corresponds precisely with a pre-specified and specific point on a closed perturbation loop path of pre-specified shape and/or size. The mechanism which determines the time point or other event that triggers the making of a corresponding, intensity observation (influence detection) may intentionally include a randomizing means which slightly varies the triggering event so as to avoid the possibility of consistently making intensity observations, etc., only at anomaly-tainted observation points (e.g., points that happen to lie on an unusual crease or plateau within an otherwise smooth, throughput profile). While the above illuminates on an advantage of the disclosed concept for the case of continuous or smooth motion, application of the concept is not limited to continuous or smooth displacement motion. The intensity observations (samplings) may be made opportunistically at any convenient time and/or location, as the state of opportunity presents itself, independently of the displacement motion (irrespective of whether the motion is smooth or discontinuous) so long as the position of each such intensity observation (or other influence detection) can be determined to an appropriate level of accuracy and/or precision. As a result, the radiation source (or other influence producing element) may have its influence-creating aspect independently pulsed and/or modulated and the intensity observations (samplings) may be made in synchronism with the pulsing clock and/or an indication of when a given (e.g., maximum) signal intensity occurs so that various samplings can be fairly compared to one another for determining the position/orientation of optimal signal coupling. In one variation, rather than waiting for the given (e.g., maximum) signal intensity of an analog-wise modulated radiation signal, the observed magnitude after coupling is normalized by, for example, multiplying with the reciprocal of the modulation factor. Normalized values can be fairly compared to one another for determining the position/orientation of optimal (or other desired) signal coupling or radiative influence.

Although the present disclosure allows for the making of intensity observations on-the-fly, and at convenient and/or randomly selected time-points, it is nonetheless within the contemplation of the disclosure to alternatively make some or all of the observations at prespecified points along a perturbation loop whose size and shape is partially or fully specified in order to obtain certain advantages such as reduction of data storage space (further described below).

Each intensity observation (e.g., On-The-Fly made detection of influence) can be compared to at least one of previously-stored, maximum and minimum intensities ($I_{maxc}$, $I_{minc}$) that had been observed (and optionally normalized) and recorded beforehand in a same manner to respectively represent the best and/or worst coupling efficiencies seen thus far. (On start-up, $I_{maxc}$ can be initialized to a system minimum value such as zero, and $I_{minc}$ can be initialized to a system maximum value.) If the latest, intensity observation is found to represent a greater coupling efficiency than that represented by the pre-stored as current-maximum value ($I_{maxc}$), then that newer intensity observation ($I_{detected}$—optionally normalized) is substituted as the new, currently-known-to-be maximum value. If the new intensity observation ($I_{detected}$—optionally normalized) is found to represent a coupling efficiency less than that represented by the pre-stored as current-minimum observation ($I_{minc}$), then that new observation is substituted as the new, currently-known-to-be minimum value.

Although the On-The-Fly made detections of influence described herein and the value substitutions described herein are for purposes of finding and recording the maximum and minimum intensities seen thus far—and their corresponding spatial coordinates—it is within the contemplation of the disclosure to instead use OTF observations to seek out, for example, a second to maximum and/or a second to minimum of intensities seen thus far—and their corresponding spatial coordinates. The latter approach may be throwing out one or both of the currently maximum and currently minimum observations/detections as being potentially noisy and therefore unreliable. Of course, to keep tabs of what is second to maximum and/or a second to minimum, additional storage may be needed so that when an incoming detection is evaluated it can be compared against the current values of latest maximum and latest, second to maximum, for example, to thereby determine whether it fits in the range between the latest maximum and latest, second to maximum, or above it or below it. The appropriate substitution is made accordingly.

The process of making observations (e.g., OTF-made detections of influence magnitude) and updating what is considered to be the currently-known-to-be maximum and minimum representative values ($I_{maxc}$, $I_{minc}$) of relative influence may continue until the absolute sizes of the update changes to the pre-stored minimum and maximum values drop below predefined threshold values and/or after a predefined amount of time has elapsed and/or some other, predefined observations-ending event occurs. In conjunction with such isolation of the maximum and minimum representative values found thus far ($I_{maxc}$, $I_{minc}$), the respectively associated coordinates for angles of advancement (and/or other position indicators) on the dithering displacement path(s) should also be recorded, for example in terms of angular coordinates: $\phi_{maxc}$, $\phi_{minc}$. The length of a corresponding alignment difference vector (e.g., optimization vector), V, may then be calculated for example, according to the following equation, Eq. 2a:

$$d_V = G' \cdot (I_{maxc} - I_{minc}) / (I_{minc}) \quad \{Eq.\ 2a\}$$

where G' is an empirically and historically determined gain value and $d_V$ is a correction distance representing the difference between an initial, pre-dither position (e.g., the original center of a non-stop and natural perturbation loop) and a predicted, peak-influence-efficiency position that corresponds via the radiation throughput profile(s) of the perturbed-and-observed devices to an $I_{peak}$ intensity value that is attainable with the perturbed-and-observed optical and/or other radiation through-putting system. $I_{maxc}$ and $I_{minc}$ are respectively the latest ones of the on-the-fly sampled, optionally-normalized, and currently-known-to-be maximum and minimum, representative values of observed throughput intensities. The angle of the corresponding difference vector, V (e.g., the coupling-improving correction vector), may be established by a hypothetical line drawn to bisect between the angles of the respectively associated locations on the dithering displacement path(s) of the found maximum and minimum representative values ($I_{maxc}$, $I_{minc}$) The associated locations of these maximum and minimum, representative values may themselves be represented in terms of angular coordinates such as: $\phi_{maxc}$ and $\phi_{minc}$. Historical control of the gain value, G', will be detailed below. Although the embodiment of {Eq. 2a} above, or that of the next-described, {Eq. 2b} below appear to leave it entirely to the gain factor, G, to normalize the length, $d_V$ of the adjustment vector, it is within the contemplation of the disclosure to include other scaling factors, such as for example, dividing by the magnitude of the distance that separates the $I_{maxc}$, and $I_{minc}$ positions so as to thereby normalize according to the width of the dithering path (e.g., the radius of the perturbation loop). Average width of the dithering path or some other such measure could be alternatively used.

In an alternate or supplemental embodiment in accordance with the disclosure, The length of a corresponding optimization vector, V, may be calculated according to the following equation, Eq. 2b:

$$d_V = G' \cdot (R_{maxc} - R_{minc}) \cdot (I_{maxc} - I_{minc}) / (I_{minc}) \quad \{Eq.\ 2b\}$$

where $R_{maxc}$ is a measured or pre-specified radius from a geometric center of a utilized perturbation loop (e.g., a quad-leaved cloverleaf) that corresponds with at least one of: $\phi_{maxc}$ and the currently-known-to-be maximum-coupling intensity value, $I_{maxc}$, and/or where $R_{minc}$ is a measured or pre-specified radius that corresponds with at least one of: $\phi_{minc}$ and the currently-known-to-be minimum-coupling intensity value, $I_{minc}$.

In an alternate or supplemental embodiment in accordance with the disclosure, The length of a corresponding optimization vector, V, may be adjusted on the fly as follows: After calculating an initial $d_V$ (e.g., by using one of equations, Eq. 2a, Eq. 2b, or variations thereof) and either completing the indicated, alignment-improving movement or a significant portion thereof (that is, after having moved along a major portion of the optimization vector, V, and while still moving along it), take a new intensity observation, and if the newly-observed intensity, ($I_{detected}$) is greater than the pre-stored as current-maximum value ($I_{maxc}$) by a predefined threshold amount (could be 0), then substituting that newer intensity observation ($I_{detected}$) as the new, currently-known-to-be maximum value and continuing to move in the direction of the originally determined, optimization vector, V, and repeating the on-the-fly observations while moving on, or having substantially reached the end of the extended optimization vector, and further extending the length of the optimization vector as just described. When the newly-observed intensity, ($I_{detected}$) is found to be less than or equal to the pre-stored as current-maximum value ($I_{maxc}$), the extension process is stopped, and a new perturbation loop may be initiated. In a further variation of this optimization vector extension approach, the old maximum value ($I_{maxc}$), which is being exceeded by the newly-observed intensity, ($I_{detected}$), is redefined as the currently-known-to-be minimum intensity value, $I_{minc}$ and substituted as such into one of equations, Eq. 2a, Eq. 2b, or variations thereof while the newly-observed intensity, ($I_{detected}$) becomes the new $I_{maxc}$, whereafter the latest vector extension distance, $d_V$ is defined in accordance with one of equations, Eq. 2a, Eq. 2b, or a variation thereof. Note that this just-described operation is essentially using a linear, dithering displacement path where two of the observations made there-along ($I_{maxc}$ and $I_{minc}$) are stored in memory and the third observation being made ($I_{detected}$) along the linear, dithering displacement path is being tested as a possible replacement in storage for the last known, $I_{max}$ value. It is fully within the contemplation of the disclosure that dithering displacement path can be a line or a zig-zag pattern that peeks at what radiative influences are available (for better or worse) adjacent to a current position or tracking path and opportunistically makes adjustments if a better radiative influence (e.g., higher coupling efficiency) is found to be available at an offset from the current position or tracking path. It is also fully within the contemplation of the disclosure that the adjustment to made to the current position or tracking path be calculated for, and/or made from, a position along the dithering displacement path rather than for/from the current position or tracking path. In other words, if a circular perturbation loop is being used, the system does not have to return to the center of the loop and then make an adjustment from this center point (this could take extra time and/or energy and can thus be wasteful). Instead, the system could base its calculations of adjustment, and/or adjustment movements relative to a current or future position along the dithering displacement path and provide the adjustment values and/or adjustment movements relative to this position along the dithering displacement path.

(B) In accordance with a second aspect of the present disclosure, alignment-improving mechanisms which are based on the above-described, replace-ably stored $I_{maxc}$ and $I_{minc}$ representative values, are programmably implemented in FPGA's, DSP's, MEMS's or like monolithic and/or integrated devices.

More specifically, in accordance with one detailed aspect of the present disclosure, a structure is provided that comprises: (a) perturbing means for moving a radiative-influence supplying and/or receiving, first element, where the perturbed movement may be about a naturally-supportable, perturbation loop which centers around an initial position of the first element; (b) excitation means for causing at least part of a reference influence signal to couple radiatively between the first element and an influence supplying and/or receiving, second element that is radiative-influence-wise couplable to the first element; (c) on-the-fly (OTF) first sampling means for taking on-the-fly first samples of energy detections (or other influence detections) made by at least one of the first and second elements of the radiatively coupled portions of the reference influence signal; (d) current maximum and/or minimum identifying means, coupled to the OTF first sampling means, for respectively identifying amongst the first samples, a corresponding current one or two that is/are respectively and currently representative of a greatest or least amount of radiative influence (e.g., radiation coupling efficiency) as compared to radiative influences represented by the first samples taken during a given sampling session; (e) second sampling means for taking second samples of a directional signal that represents an angular position of the first element on the perturbation loop relative to said initial position, where said second samples correspond to respective angular positions of the first element when the first element is detecting the energy coupling that is identified by the current maximum and/or minimum identifying means as being currently a greatest or least of the influence coupling detections made by the at least one of the first and second elements; (f) optimization vector producing means, operatively coupled to the current maximum and/or minimum identifying means and to the second sampling means, for producing an optimization vector signal from information defined by at least two of: (f.1) the initial position of the first element; (f.2) the identified first sample that has been identified as representing the greatest of the influence coupling findings made during the given sampling session and the corresponding second sample associated with said, identified as greatest, first sample; and (f.3) the identified first sample that has been identified as representing the smallest of the influence coupling findings made during the given sampling session and the corresponding second sample associated with said, identified as smallest, first sample, wherein (f.4) said optimization vector signal represents an adjustment movement direction that can be or is to be taken when relatively moving the first element from its initial position (or elsewhere) toward an improved-alignment position, and said optimization vector signal further represents a relative adjustment movement distance to be traveled when relatively moving the first element from its initial position (or elsewhere) toward the improved-alignment position; and (g) adjustment making means, coupled to the first element and responsive to the optimization vector producing means, for moving the first element relative to the second and/or vice versa in accordance with the optimization vector signal.

In accordance with a second detailed aspect of the present disclosure, an alignment improving method comprises: (a) moving an influence providing and/or detecting, first element along a dithering displacement path (e.g., moving it about a perturbation loop) which substantially centers around an initial position of the first element; (b) causing at least part of a reference influence signal to couple radiatively between the first element and a influence providing and/or detecting, second element that is influence-wise radiatively couplable to the first element; (c) taking on-the-fly first samples of influence detections made by or through at least one of the first and second elements of the radiatively coupled portions of the reference influence signal while said first element is moving along the dithering displacement path; (d) respectively identifying amongst the first samples, a corresponding current one or two of the first samples that is/are respectively and currently representative of a greatest or least influence coupling (e.g., radiation coupling efficiency) as compared to influence couplings represented by the first samples taken during a given sampling session; (e) taking second samples of a displacement signal that represents a position of the first element on the dithering displacement path relative to said initial position (or elsewhere), where said second samples correspond to respective positions of the first element when the first element is detecting the influence coupling that is identified by the identifying step as being currently a greatest or least of the influence coupling findings made by the at least one of the first and second elements; (f) producing an optimization vector signal from information defined by at least two of: (f.1) the initial position of the first element; (f.2) the identified first sample that has been identified as representing the greatest of the influence coupling detections made during the given sampling session and the corresponding second sample associated with said, identified as greatest, first sample; and (f.3) the identified first sample that has been identified as representing the smallest of the influence coupling detections made during the given sampling session and the corresponding second sample associated with said, identified as smallest, first sample, wherein (f.4) said optimization vector signal represents a relative adjustment movement direction to be taken when relatively moving the first element from its initial relative position (or elsewhere, and as defined relative to the second element) toward an improved influence position, and said optimization vector signal further, optionally represents an adjustment movement distance to be traveled when relatively moving the first element from toward the improved-influence position; and (g) moving the first element relative to the second and/or vice versa in accordance with the optimization vector signal.

Other aspects of the disclosure will become apparent from the below detailed description.

DESCRIPTION OF THE DRAWINGS

The below detailed description section makes reference to the accompanying drawings, in which:

FIG. 6A is a perspective view of a computer structured in accordance with the disclosure for either carrying out the OTF perturb-and-observe mode (POM) and adjustment execution mode (AEM) itself or for configuring a programmable logic device (e.g., FPGA) to instead carry out one or both of the POM and AEM; and FIG. 6B is a block diagram showing an organization that may be used for the computer of FIG. 6A and showing how manufactured instructing signals may be introduced into an instructable portion of the computer for causing the computer to effect the carrying out of the OTF perturb-and-observe mode (POM) and adjustment execution mode (AEM).

Definitions and Caveats

New technologies often benefit from the coining of new terminology that describes novel characteristics. Such is true for the digital gradient search technique disclosed in the above-incorporated U.S. Pat. No. 5,278,934. That patent described the steps of: "detecting throughput intensities at different specific points along the imposed loops, arranging detected throughput intensities at corresponding different specific points in an array, and identifying from that point-specific memory array the relative orientation of the objects at which a maximum throughput has occurred".

Many similar terms, such as "loop", "observed intensity" and so forth may be re-used herein. It should be noted however, that the perturbation loops described herein are not necessarily synonymous with the fixed-shape loops and pre-specified specific sample-taking points along such loops of U.S. Pat. No. 5,278,934 unless explicitly stated herein. Reasons for why will become apparent below.

DETAILED DESCRIPTION

Figure 1:
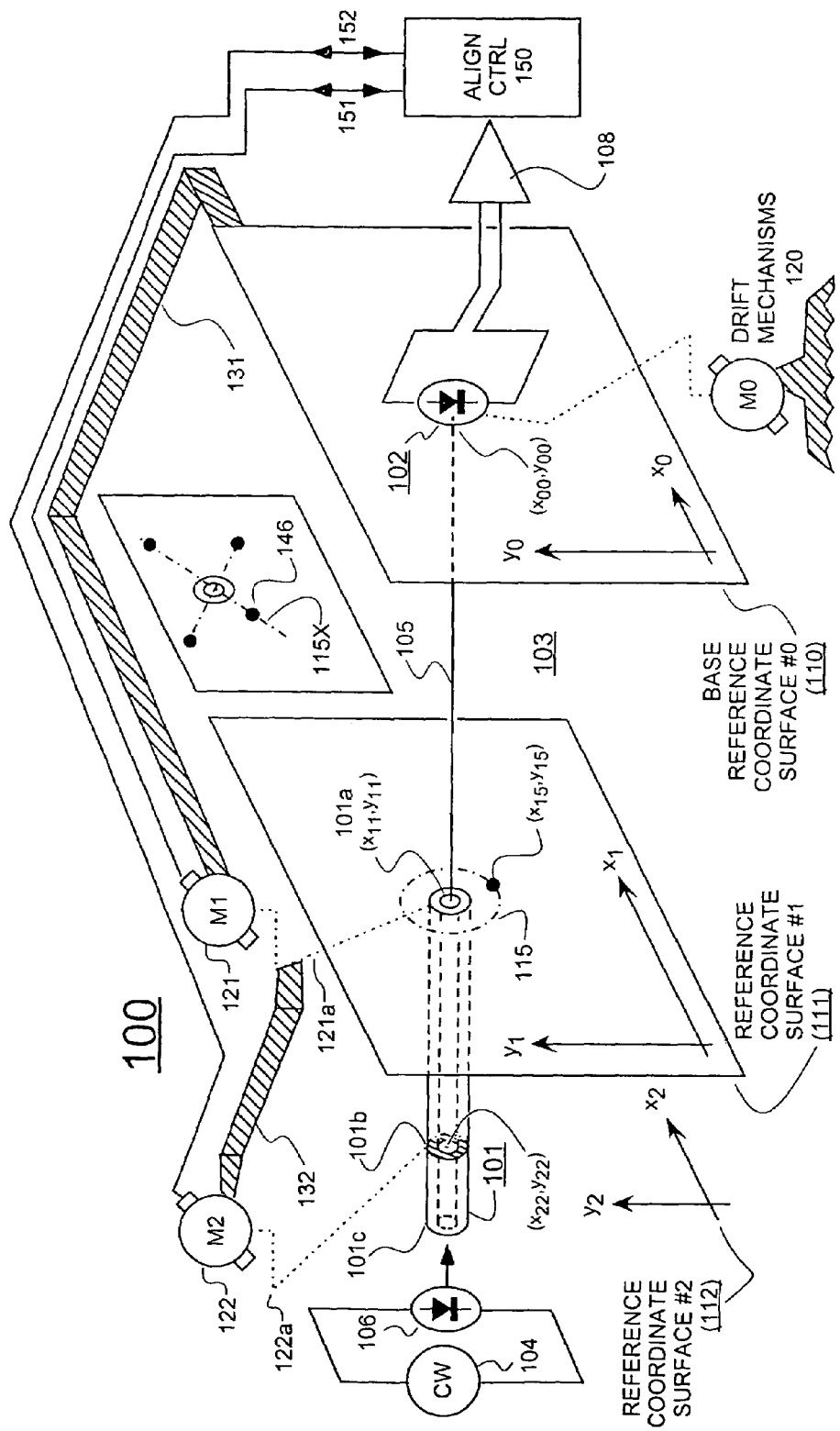
FIG. 1 is a perspective diagram of a first alignment system that may be implemented in accordance with the present disclosure.

FIG. 1 is an introductory perspective diagram of an alignment system 100 to which the here disclosed invention may be applied. Shown at 101 is a first radiation supplying and/or receiving and/or steering element, which in the illustrated example is an optical fiber. Any other type of radiation supplying and/or receiving and/or steering element (e.g., one which has a spatially-nonuniform, radiation output and/or input, intensity profile) may be alternatively used with appropriate accommodations being made for that otherwise used, radiation supplying and/or receiving and/or steering element 101.

Shown at 102 is a second radiation receiving and/or supplying and/or steering element, which in the illustrated example is a photodiode. Once again, any other type of radiation supplying and/or receiving and/or steering element may be instead used with appropriate accommodations being made for that otherwise used, radiation supplying and/or receiving and/or steering element 102 provided that alternate element 102, in combination with first element 101, creates a situation where a nonuniform, radiation throughput profile can exist for radiation coupled between elements 101 and 102. In the case where both of elements 101 and 102 are merely steering elements (e.g., radiation guiding, optical fibers) it is understood that the radiation detection function (which in FIG. 1 is performed by 102) and the radiation sourcing function (which in FIG. 1 is performed by 106) may be provided other elements along the optical train.

An energy coupling region between the first and second elements 101 and 102, is denoted generally in FIG. 1 as 103. The coupling region 103 may be empty, or it may be filled with one or more materials such as for example, air; and/or with a liquid where the latter might be, for example, a curing epoxy. The energy coupling region 103 may alternatively or additionally include a solid such as for example, glass. Generally speaking, coupling region 103 may be defined by any appropriate coupling medium that allows for radiative energy coupling between the first and second elements 101 and 102. Coupling region 103 may be such that relative movement of one or both of elements 101 and 102 creates a situation where a nonuniform, radiation throughput profile can exist for radiation passed between elements 101 and 102 as the position of one or both of elements 101 and 102 changes (and/or as the coupling medium 103 changes). The goal here will be to move one or both of elements 101 and 102, and/or to modify the coupling medium 103 so that relative coupling efficiency between elements 101 and 102 is improved.

The example provided by FIG. 1 is not to be seen as limiting the broader concepts mentioned in the above summary. Electromagnetic radiation coupling is but one example of radiative influence coupling. Radiative influence coupling may include the coupling of electrostatic or magnetic influence. It may include the coupling of inter-molecular or inter-atomic force fields. It may include the influence coupling that occurs when a laser or other cavity is tuned so as to encourage certain oscillatory behavior and/or discourage other oscillatory behavior. As such, it is within the contemplation of the present disclosure to apply the concepts developed herein for use in improving the tuning of cavities and/or in the determining of how close to ideal a cavity is tuned. It is within the contemplation of the present disclosure to apply the concepts developed herein for use in improving the tracking of objects, including the tracking of nanoscale sized objects through the use of detection of inter-atomic coupling forces. It is within the contemplation of the present disclosure to apply the concepts developed herein for use in improving alignment and/or tracking of fiducials of radiatively cross-influenced elements, such as more specifically, assuring a substantially parallel alignment between planar surfaces where the surfaces have radiatively cross-influenced elements provided on them. The fiducials aspects may include assuring a substantially orthogonal alignment between a planar first surface having a first element on it and one or more linearly-extending, second objects (e.g., a nanotube or an array of nanotubes) that define second, radiative influence coupling elements. It is believed that is easier to begin the explanations with the illustrative case of trying to optimize radiative coupling of electromagnetic (EM) signals between an EM source and an EM receiver. This illustrative example is not to be seen as limiting of the broader concepts disclosed herein.

In the illustrated example of FIG. 1, a continuous wave (CW) signal generator 104 drives a further photodiode 106 (second photodiode). A constant level of excitational energy is output from the second photodiode 106 and supplied through optical fiber 101 for emission across the coupling region 103 as emitted radiation 105. At least part of this radiation 105 is to be coupled to, and detected as a radiative influence by the first photodiode 102. The first photodiode 102 is coupled to a transducer interface circuit 108 that outputs an electrical signal indicative of the intensity of radiant energy detected by photodetector 102. This detected intensity can change if the mechanical state of one or more of elements 101, 102 and coupling region 103 changes. As indicated, the goals of alignment system 100 may include the adjustment of the mechanical state(s) of one or more of elements 101, 102 and coupling region 103 so that a relatively maximal amount of radiative energy 105 is coupled to and detected by photodiode 102. In other words, the goal is to improve or optimize coupling efficiency between elements 101 and 102.

For further purposes of introduction, the first photodetector 102 is initially assumed to be spatially fixed at a corresponding base location ($x_{00}$, $y_{00}$) on a base reference coordinate surface 110. The base coordinate surface 110 can be planar, spherical or of another form and unique points thereon may be identified by Cartesian, polar or other coordinate systems. To keep things simple, we show base surface 110 as a planar one having orthogonal reference axes, $x_0$ and $y_0$.

In contrast to the essentially fixed positioning of the first photodetector 102 on surface 110 (also SURFACE #0), a radiation-emitting, first end 101a of the optical fiber is assumed to be positioned initially at a location ($x_{11}$,$y_{11}$) on, but movable along, what is referred to here as a first reference coordinate surface 111 or SURFACE #1 for short. The first coordinate surface 111 can be planar, spherical or of another form and unique points thereon may be identified by Cartesian, polar or other coordinate systems. To keep things simple, we show SURFACE #1 as being a planar one having corresponding orthogonal reference axes, $x_1$ and $y_1$. (It is however, within the contemplation of the present disclosure to instead utilize angular tilt or other such operations for aligning optical components.) The first end 101a of the optical fiber may be moved along SURFACE #1 to any desired position or any desired set of positions on that first coordinate surface 111. In particular, the first end 101a may be slightly perturbed away from its initial location ($x_{11}$,$y_{11}$) and moved about a perturbation loop 115 that includes locations that are slightly displaced relative to the initial location 101a. The illustrated sample point, ($x_{15}$,$y_{15}$) is an example of such a slightly displaced location on the perturbation loop 115.

Because of the nature of the invention and because of the wide range of possibilities available for what constitutes a slight "perturbation" as opposed to a significant movement away from the initial location ($x_{11}$,$y_{11}$), it is not possible to give an exact definition of what constitutes a slight perturbation. Practitioners in the art will understand nonetheless that slight means less than a substantial change of position and that such a slight perturbation will not greatly alter the radiative signal coupling between fiber end 101a and the first photodetector 102. By way of example, if the statistically nominal amount of alignment adjustment made for a given pair of mass-produced elements is measured in centimeters, then a slight "perturbation" may be acceptably measured in distances of one or more orders of magnitude below, in other words, in terms of millimeters or micrometers. As a further example, if the statistically nominal amount of alignment adjustment made for a given pair of mass-produced elements is measured in millimeters, then a slight "perturbation" may be acceptably measured in distances of orders of magnitude below, in other words, in terms of micrometers or nanometers.

Although a circular perturbation loop 115 is shown in FIG. 1 as being traced out on the first coordinate surface 111, it is to be understood that such is disclosed merely for the sake of simplicity and initial introduction. It is fully within the contemplation of the present disclosure to use other forms of dithering displacement paths such as the two-stroke, X-shaped dithering motion illustrated at 115X for example; or even a simple linear back and forth, or a zig-zag motion. It will be seen that intensity observations may be made independently of the dithering motion. Using the X-shaped dithering motion 115X as an example, intensity observations may be made randomly and on-the-fly, such as when fiber end 101a is passing over sampling point 146. Intensity observations may be alternatively or additionally made at pre-specified stop points (e.g., end points) along the X-shape defining, dithering displacement paths as may be appropriate. Other dithering displacement motions are possible, such as the tracing out of a one stroke V-shape (not shown) that is centered about the fiber end's initial position ($x_{11}$,$y_{11}$). It will be seen that there are substantially no limitations to picking out appropriate dithering displacement motions as long as valid and positionally-distinguishable intensity samplings (e.g., 146) can be made along their corresponding, dithering displacement paths (115, 115X) for producing a directional correction vector (see 218 of FIG. 2A, described below), where the correction vector is derived from the plural samplings made along the traced displacement path(s) and the samplings include found points corresponding to observed $I_{minc}$ and $I_{maxc}$ values. The $I_{minc}$ and $I_{maxc}$ values in turn correspond to relative minima and maxima values of observed, radiation coupling efficiencies.

In the illustrated alignment system 100 of FIG. 1, a first motor means (M1) 121 is mechanically coupled by way of an appropriate coupling means 121a to the first end 101a of the optical fiber for moving that end 101a along reference SURFACE #1. This first motor means 121 is capable of slightly perturbing the first end 101a of the fiber to move continuously along a small perturbation loop 115 as well as moving the first end 101a by substantially greater distances. Once again, although the illustrated loop 115 is shown to be circular, it is to be understood that any appropriate dithering displacement motion may be used, including any closed path that centers on initial location ($x_{11}$,$y_{11}$) but is mostly spaced, slightly away from location ($x_{11}$,$y_{11}$). Such closed perturbation loop paths may include one or more shapes such as ellipses, figure-8 patterns, clover-leaves, Lissajous patterns and the like. Most of the points on perturbation loop 115 should be uniquely identifiable by an angle designator or another means for indicating where, relative to initial location ($x_{11}$,$y_{11}$), a given sample point, ($x_{15}$,$y_{15}$) on loop 115 is located.

Preferably, the perturbation loop 115 is one that can be naturally and easily sustained with relatively little energy input under the given context of the vibrational characteristics of the alignment system (including characteristics of M1, coupling means 121a and/or fiber 101). By naturally and easily maintained, we mean that the first motor means 121 (M1) should not have to be driven at relatively high energy levels in order to overcome excessive damping forces of the alignment system and/or that the first motor means 121 (M1) should not have to excessively battle against run-away harmonics when maintaining the utilized dithering displacement motion (e.g., circular perturbation loop) 115. Of course, other types of perturbation paths, which may be partially or fully unnatural, open or closed loop, are also within the scope of this disclosure. The first motor means M1 may include piezoelectric elements, electromagnetic elements, magnetostrictive elements, electrostrictive elements, electrostatic elements, and/or the like for providing fine movement for producing the perturbation loop 115 and for providing coarse movement for moving fiber end 101a by a substantially larger distance to a more optimal location. The first motor means M1 may additionally or alternatively include x-y transducers or drivers which may be respectively energized by sine wave and cosine wave energization signals for producing elliptical, circular, or other perturbation loop patterns as may be appropriate. The sinusoidal energizations signals for the x-y transducers may be derived from 50 Hz or 60 Hz or 400 Hz line current, or from other available sources as may be convenient. As seen in FIG. 1, the first motor means (M1) 121 is fixedly connected to a first reference frame 131 associated with base coordinate surface 110 (SURFACE #0). The movable portion 121a of the first motor means 121 supports a second reference frame 132 onto which an, optional second motor means (M2) 122 is attached.

The optional, second motor means 122 may be mechanically coupled by way of an appropriate coupling means 122a to an intermediate and cross-sectional part 101b of the optical fiber for moving that part 101b a second reference surface 112 (SURFACE #2). This second motor means 122 is capable of slightly perturbing the intermediate, cross-sectional part 101b of the fiber to move continuously and/or otherwise along an appropriate, further dithering displacement path (e.g., a small perturbation loop; not shown) on a third reference coordinate surface 112 or SURFACE #2 for short and to move part 101b by substantially greater distances. Thus the potential movements on SURFACE #2 include fine and coarse movements which thereby change the angle of incidence of the longitudinal axis of fiber 101 with SURFACE #1. In order to avoid illustrative clutter, only exemplary orthogonal reference axes, $x_2$ and $y_2$ for SURFACE #2 are shown. This third coordinate surface 112 (SURFACE #2) can be planar, spherical or of another form and unique points thereon may be identified by Cartesian, polar or other coordinate systems. To keep things simple, we assume third surface 112 to be a planar one having orthogonal reference axes, $x_2$ and $Y_2$. A hemispherical shape for SURFACE #2 with radius originating at the center of fiber end 101a is also contemplated. Other surface contours with other surface-defining points (e.g., such as those which control the movement contour based on focal point, beam waist, waveguide channel, and/or other optically-related criteria) are also contemplated.

In one embodiment, a hexapod micro-positioner is used for providing the mechanical translations of the perturbation loop 115 and/or the correction vector (see 218 of FIG. 2). One example is the Polytec PI hexapod 6-DoF (degrees of freedom) micro-positioner available from PI (Physik Instrumente) L.P. of Tustin, Calif. Unlike ganged positioners where the y-axis drive is stacked on the movable stage of an x-axis drive and so on, a hexapod micro-positioner has a single movable stage with 3 pairs of movable legs attached to it. The legs in each pair are oriented at symmetrically opposed angles and the pairs are further oriented at opposed angles to one another so they can provide a wide number of tilting motions at their attachment joints. With appropriate control software, the movable stage of a hexapod can carry out conventional Cartesian displacement as if it had independent x, y and z stages. The advantages of a hexapod micro-positioner include fewer flexible cables and lower combined mass for the movable portions. (Ganged x, y, z positioners have 3 movable stages. The total movable is mass is the sum of the masses of those stages thereby leading to higher inertia and greater energy consumption.)

Radiation energy source 106 is understood to be positioned further back along the fiber 101 (or earlier in the optical train) and operatively coupled into the fiber's back end 101c such that the changing of the incidence angle by the second motor means (M2) 122 does not substantially affect the level of energy supplied into the fiber by source 106. Although signal generator 104 is initially shown as a continuous wave (CW) type, it is within the contemplation of the present disclosure to allow signal generator 104 to be modulated in a variety of ways including binary modulation, pulsatile variation, pulsatile binary coding, wavelength modulation, and/or by slow analog modulation where the analog modulation is not a perfect harmonic of the cycling frequency of fiber end 101a around perturbation loop 115. In the latter case readings taken by the detector 102 may be normalized so as to counter compensate for the analog modulations and/or zero-signal drop-outs. In one embodiment, an electrical signal that is representative of reciprocal of the analog modulation factor is provided. (Use of the reciprocal and recording of a sample point is blocked if the reciprocal exceeds a predetermined threshold; indicating a possible no-signal-is-present condition.) The readings taken by detector 102 are then multiplied by the reciprocal representing signal so as to generate normalized detection readings. The normalized detection readings may then used as if the radiation originated from a constant intensity source (CW source 104) rather than a modulated one.

Figure 3:
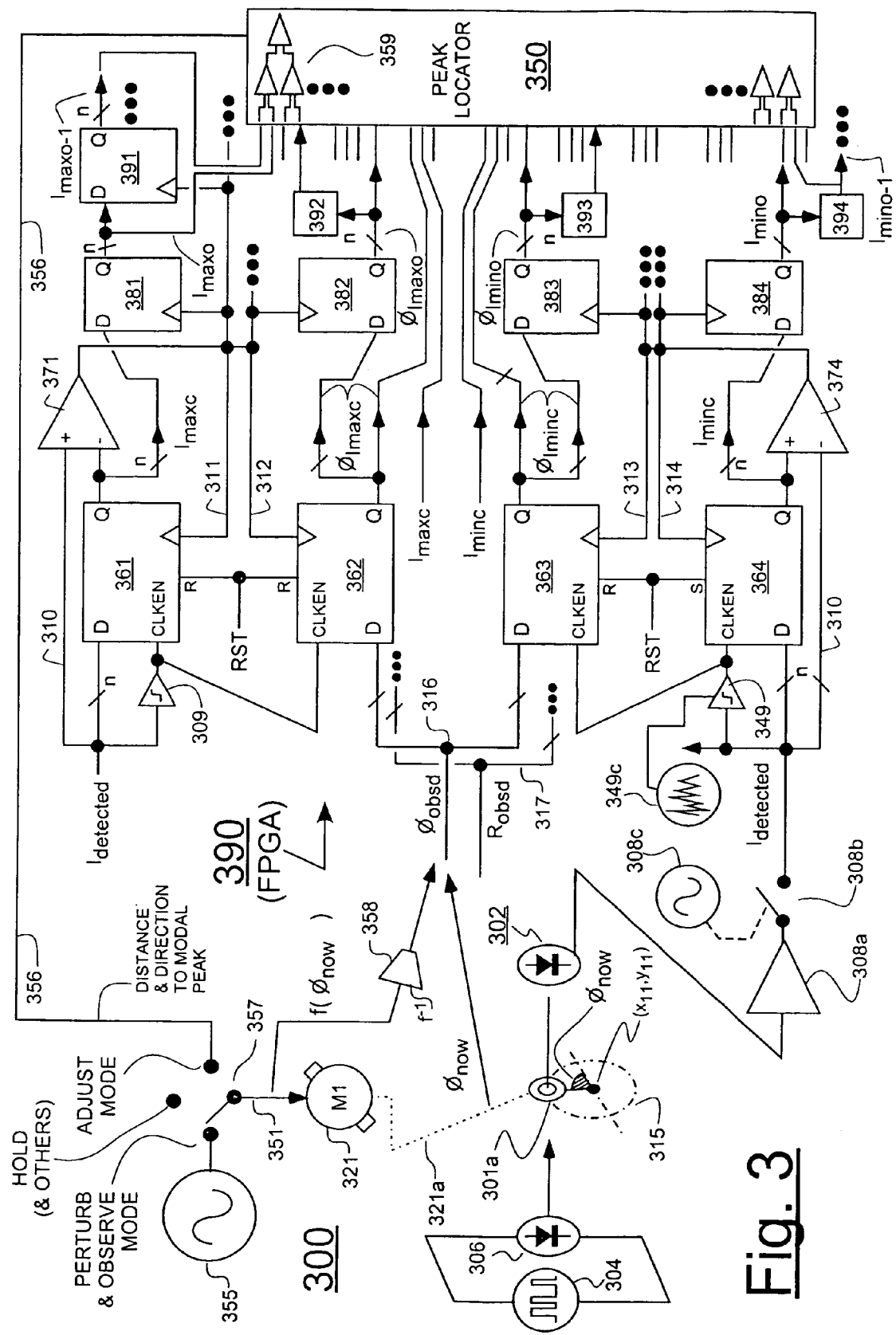
FIG. 3 is a schematic diagram of an alignment-improving system in accordance with the present disclosure.

More generally speaking, a variety of means can be deployed for counter-compensating for the modulation of the radiated energy being output by the radiation energy source 106. The counter-compensating means operate such that the effective degree of energy coupling (coupling efficiency) between fiber end 101a and detector 102 can be appropriately determined and used for aligning or pre-aligning or maintaining the position of end 101a relative to detector 102 so that a substantially optimized coupling efficiency is obtained. In the example of FIG. 3 (described below), it will be seen that for one counter-compensating approach, observation is triggered at opportunistic points in time when the radiation energy source 106 is outputting a substantially same level of energy as it did for previous samples. A combination of opportunistic sampling and modulation factor canceling may also be used. In cases where the radiation energy source 106 fluctuates periodically (e.g., sinusoidally) and with large amplitude swings, samplings may be taken at time points that are spaced apart by whole multiples of the oscillation period, and as a result, the effects of the large oscillations in output magnitude at the radiation energy source 106 may be masked out (filtered out) from the observation samples used by the alignment system.

In the embodiment of FIG. 1, an alignment control unit 150 is operatively coupled by a bidirectional line 151 to the first motor means 121 and, optionally by bidirectional line 152 to the optional second motor means 122. Lines 151 and 152 may be used for determining the respective, current output positions $(x_{11}, y_{11})$ and $(x_{22}, y_{22})$ of those respective motors and for driving those respective motors (M1, M2) to effect desired fine and coarse position changes along respective reference surfaces 111 and 112. The alignment control unit 150; and/or motors M1, M2; and/or their respective drive-coupling means, 121a, 122a preferably include some means for determining what angle $(\phi_{now})$ is made on the respective movement surface (111 or 112) by a line drawn on that surface and connecting from a center (e.g., $(x_{11}, y_{11})$) of a given perturbation loop (e.g., 115) to a current position (e.g., $(x_{15}, y_{15})$) of a positionally-perturbed part (e.g., 101a). The reason for this will become clearer when we discuss FIG. 3.

The goal of system 100 is to drive at least one of the first and second motor means 121 and 122 to respective states where the corresponding fiber end 101a will be re-located to an improved-coupling position (e.g., ($x_{18}$,$y_{18}$)—not shown) on SURFACE #1 (111) and/or such that the longitudinal axis of fiber end 101a will be inclined relative to SURFACE #1 so that a substantially larger amount of emissive radiation 105 will be coupled into and/or detected by photodetector 102. In other words, coupling efficiency between elements 101, 102 and across interface 103 will be improved.

For purposes of completeness in our description, FIG. 1 shows that one or more, undesired drift mechanisms such as 120 may be present in the illustrated system 100 for slowly altering the optically-effective position of the photodetector 102 from its base position ($x_{00}$,$y_{00}$), thereby shifting it to a new optically-effective position on SURFACE #0. It is possible in some systems for the optically-effective coordinate framework to be somewhat de-coupled from the mechanically-effective coordinate framework such that even if drift does not occur in the mechanically-effective coordinate framework, such drift 120 may nonetheless occur in the optically-effective coordinate framework, due for example to thermally-induced changes in optical characteristics (e.g., focal point) of one or more optical elements in the coupling train (e.g., 101, 102, 103). If such drift mechanisms 120 are present, alignment control unit 150 may be called upon repeatedly to adjust one or both of the location and incidence angle of the first fiber end 101a so as to maintain an adequate value of energy coupling efficiency between element 101 and element 102 in spite of the drift 120. What constitutes "adequate" energy coupling efficiency can vary from one application to another. It is understood to include the maintenance of near or at maximum energy coupling between the first and second elements, 101 and 102. It is also within the contemplation of the present disclosure to have an alignment system that seeks out a minimal energy coupling state between the first and second elements as opposed to the maximum energy coupling state. The adjustment vector for such a case may simply be opposite in direction to that used for seeking out the maximum coupling state. Conversely, upon generating an adjustment vector which points to a position associated with the locally-minimal coupling efficiency, a system which seeks to improve coupling efficiency would simply move in the opposite direction and by a distance which might be inversely correlated to the length of the generated adjustment vector. (The logic of the last part is that the closer the system is to the efficiency minimizing state, the further it probably is from the efficiency minimizing state. That logic does not, of course, hold in every case.)

Although the above description of FIG. 1 may have created certain inferences about the nature of SURFACE #0 (110), namely that in one embodiment it is not moving and that it has but one photo-detector 102 on it, none of that has to be true. SURFACE #0 may be moving relative to yet another, base reference frame (not shown); SURFACE #1 may be moving relative to that other, base reference frame (not shown); and the alignment control system 150 may be trying to maintain a relatively "fine" alignment between fiber end 101a and the first photodiode 102. A more "coarse" alignment control system (not shown) may be simultaneously providing a coarse tracking alignment between the moving SURFACE #0 and the moving SURFACE #1. Photo-detector 102 may be a center pixel in an array of photo-detectors (e.g., a CCD array) and the signal of that center (or other) pixel may be used for keeping the array centered or otherwise aligned relative to movable source point 101a. Some or all of the alignment-maintaining motor means (e.g., 121, 122) may be provided on the side of the detector 102 rather than on the side of the radiative influence providing source 101a. Coarse tracking means may also be provided fully or partially at either or both of movable surfaces 110 and 111. Dithering perturbation may be carried out at the side of the radiative influence detector (102) rather than the influence supplier (101a). Therefore, a given pixel (e.g., 102) with an imaging array (e.g., 110) may be used to track a moving point source (e.g., 101a) that is radiatively spaced away from the detector (e.g., 102).

Figure 2A:
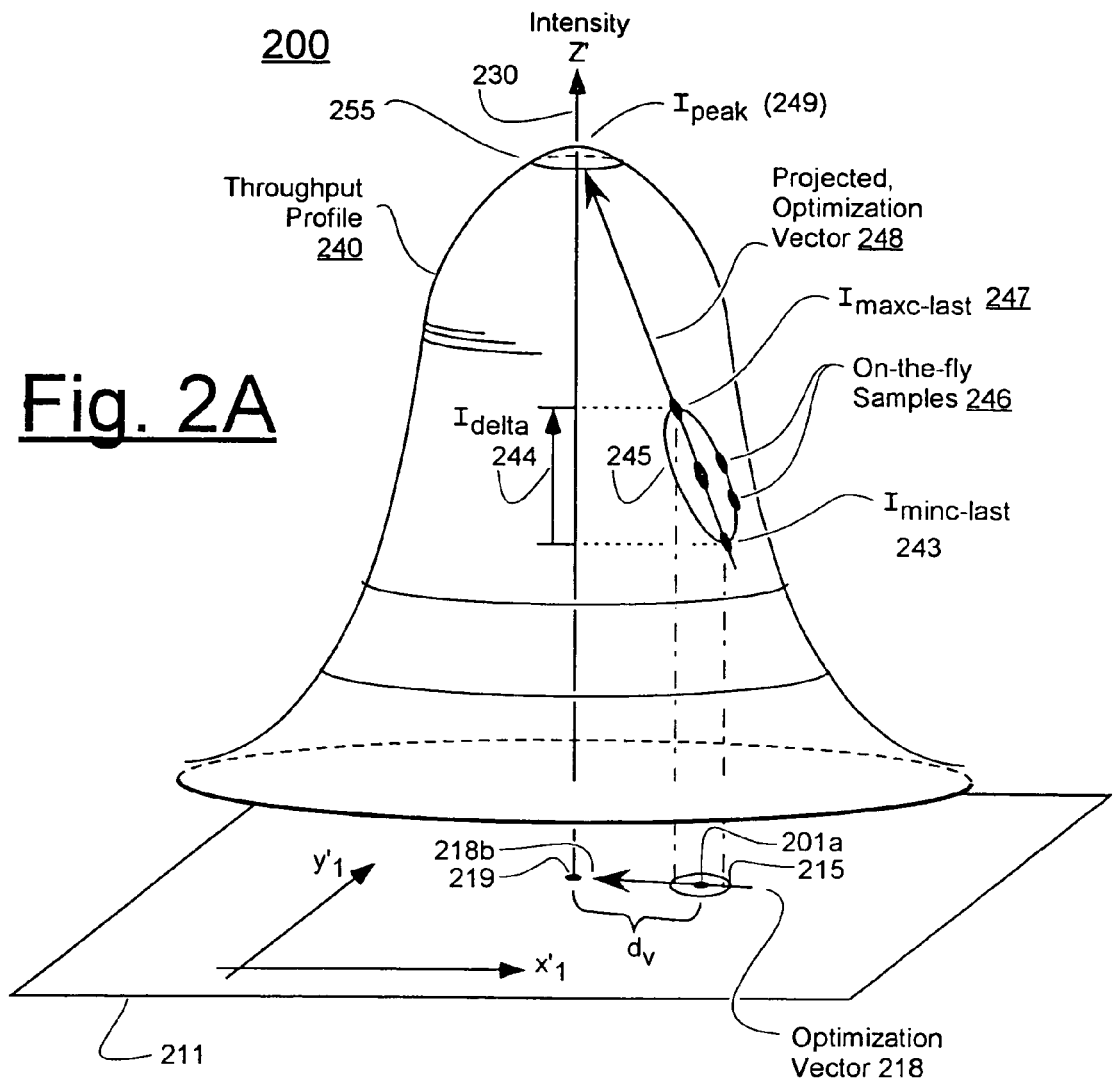
FIG. 2A is a 3-dimensional graph illustrating various aspects of the disclosure.

FIG. 2A provides a 3-dimensional graph 200 that shows a possible interrelationship between: (1) the two-dimensional positions of a perturbable part (e.g., fiber end 101a which could have an initial, current position at 201a), where the part's positions are distributed on a corresponding reference surface 211; and (2) the one-dimensional throughput intensities that may be detected by the radiatively-coupled system when that perturbable part is moved. An example is one where the perturbable part is moved slightly away from its initial position 201a, and moved along a dithering displacement path such as the illustrated natural perturbation loop 215. Two of the axes ($x_1'$, $y_1'$) of graph 200 are therefore defined by all unique position points on reference surface 211 while the third axis 230 ($z_1'$) represents throughput intensity as detected by a radiation detector like photodiode 102 of FIG. 1.

Typically, for a constant level of input radiation (104), the correspondingly detected intensity (230) for respective points on the positional reference surface 211 will represent the corresponding coupling efficiency (normalized radiative influence coupling). With input radiation (104) held constant, both the intensity profile surface (240) and the coupling-efficiency profile surface (same as 240 in this case) will take on a substantially unimodal, bell-shaped 3-dimensional form such as indicated at 240. Other throughput profiles with multiple hills, valleys and saddle points are, of course, possible. The principles developed here may be appropriately used for such other throughput profiles (not shown) to locate their respective global or local hilltops and/or saddle points as may be desired. In the case where input radiation intensity (104) is modulating with time, an appropriate normalizing transformation may be applied to the raw values of the detected intensity (230) so that the effects of such over-time modulations will be filtered out before the detected and normalized intensity values are used to represent the coupling efficiency between the alignable elements (e.g., 101–102). By way of example, the raw intensity values may be multiplied by a signal that generally represents the reciprocal of the radiation modulation factor in order to counter compensate for the modulation. (In one embodiment, the reciprocal-representing signal saturates towards a predetermined maximum as the radiation modulation factor drops below a predetermined threshold and approaches zero. If the reciprocal-representing signal hits its predetermined maximum, it may be assumed that no signal is present and therefore the detection does not provide a valid sample. The invalid sample may be simply dropped. That is one of the advantages of the disclosed approach: it does not require the use of every possible sample taking or the use of samples at specific locations in order to generate an adjustment vector.)

The unimodal throughput profile 240 shown in FIG. 2A has a single intensity peak ($I_{peak}$) as denoted at 249. When the perturbation loop 215 is projected up from reference surface 211 onto the three-dimensional throughput profile 240, a projected version 245 of the perturbation loop appears on the surface of the throughput profile 240. Points on the projected perturbation loop 245 represent the observable intensities (optionally normalized) for respective position points on the real perturbation loop 215. Accordingly, as the perturbed part (e.g., 101a) cycles about respective positions on the real perturbation loop 215, the correspondingly observable throughput intensities will define respective points on the projected perturbation loop 245. Various samplings of these observable intensities may be taken on-the-fly (and randomly or otherwise, including those taken by stopping at specific points and/or those which include post-observation normalization). Two such possible samplings are indicated for example at 246. Among the taken samples (optionally normalized), one sample, 247 should correspond to the most maximum intensity value $I_{maxc\text{-}last}$ observed thus far amongst the taken samples. Another of the samples, 243 should correspond to the most minimum value, $I_{minc\text{-}last}$ of the on-the-fly or otherwise taken samples 246 where the sample takings that produce the maximum and minimum detections occur over roughly the same period of time (a same sampling session).

If we assume that projected point 247 is truly the most maximum (highest) point on the projected loop 245 and that point 243 is similarly the true minimum of the projected perturbation loop 245, then a line 248 may be drawn from the $I_{minc\text{-}last}$ point (243) to the $I_{maxc\text{-}last}$ point (247) to thereby define a projected optimization vector 248 on the profile surface. If the throughput profile 240 is a monotonic function, as is usually the case, then the projected optimization vector 248 should point from the center of the projected loop 245, uphill towards the peak 249 of the profile 240. (Those skilled in the art sometimes refer to such an uphill type of vector as a hill-climbing vector.) The length of the projected optimization vector 248 may be empirically guessed at from the intensity delta ($I_{delta}$) 244 that is present between the latest maximum value 247 and the latest minimum value 243 among the taken samples 246.

If the projected optimization vector 248 is de-projected back down to the position reference surface 211, we can obtain an actual optimization vector 218 (on surface 211) that extends from the center 201a of perturbation loop 215 towards a to-be-adjusted-to position 219 that should correspond to intensity peak 249 ($I_{peak}$). Length $d_v$ of the optimization vector 218 may be empirically guessed at from the observed $I_{delta}$ (244). One example of how such empirical derivation may be carried out, is to use the following equation, Eq. 2a' for determining or estimating the length of optimization vector 218:

$$d_V = G' \cdot (I_{maxc} - I_{minc})/(I_{minc}) \quad \{\text{Eq. 2a'}\}$$

where ($I_{maxc} - I_{minc}$) is an alternate expression of $I_{delta}$, where G" is an empirically determined gain value and where $d_V$ is a distance to be traveled from the original center of the real perturbation loop 215 toward the estimated peak position 219 for the throughput profile 240. $I_{maxc}$ and $I_{minc}$ are respectively the latest ones of the currently-known-to-be maximum and minimum values of observed (and optionally normalized) throughput intensities in a given sampling session that correspond respectively to the currently-known-to-be maximum and minimum coupling efficiencies. In one embodiment, G" is made a variable function of the difference value, $I_{maxc} - I_{minc}$ where the variable function saturates at a predetermined maximum absolute magnitude as the absolute value of the difference value drops below a predetermined threshold and approaches zero. This helps to prevent overshoots for small positional errors. Other servo control methods may be alternatively or additionally used including simply clipping $d_v$ and/or using an integration based control loop.

Figure 2B:
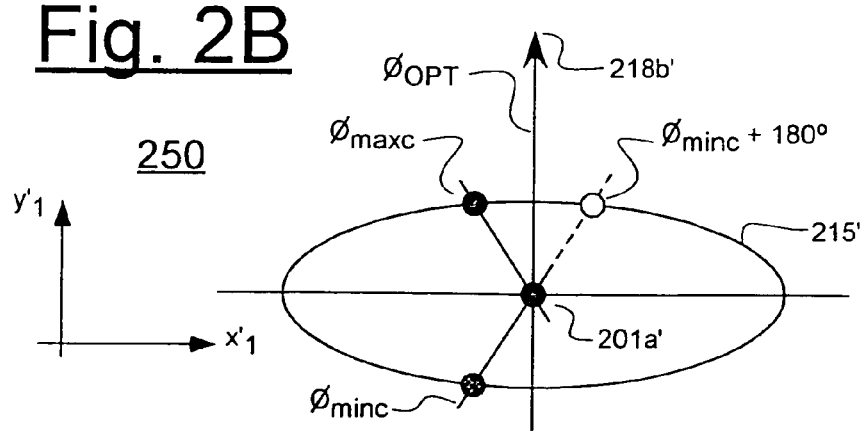
FIG. 2B is a 2-dimensional graph showing how the direction of an optimization vector may be resolved from less than perfect observations about what constitute the maximum and minimum intensity points on a given perturbation loop.
Figure 2C:
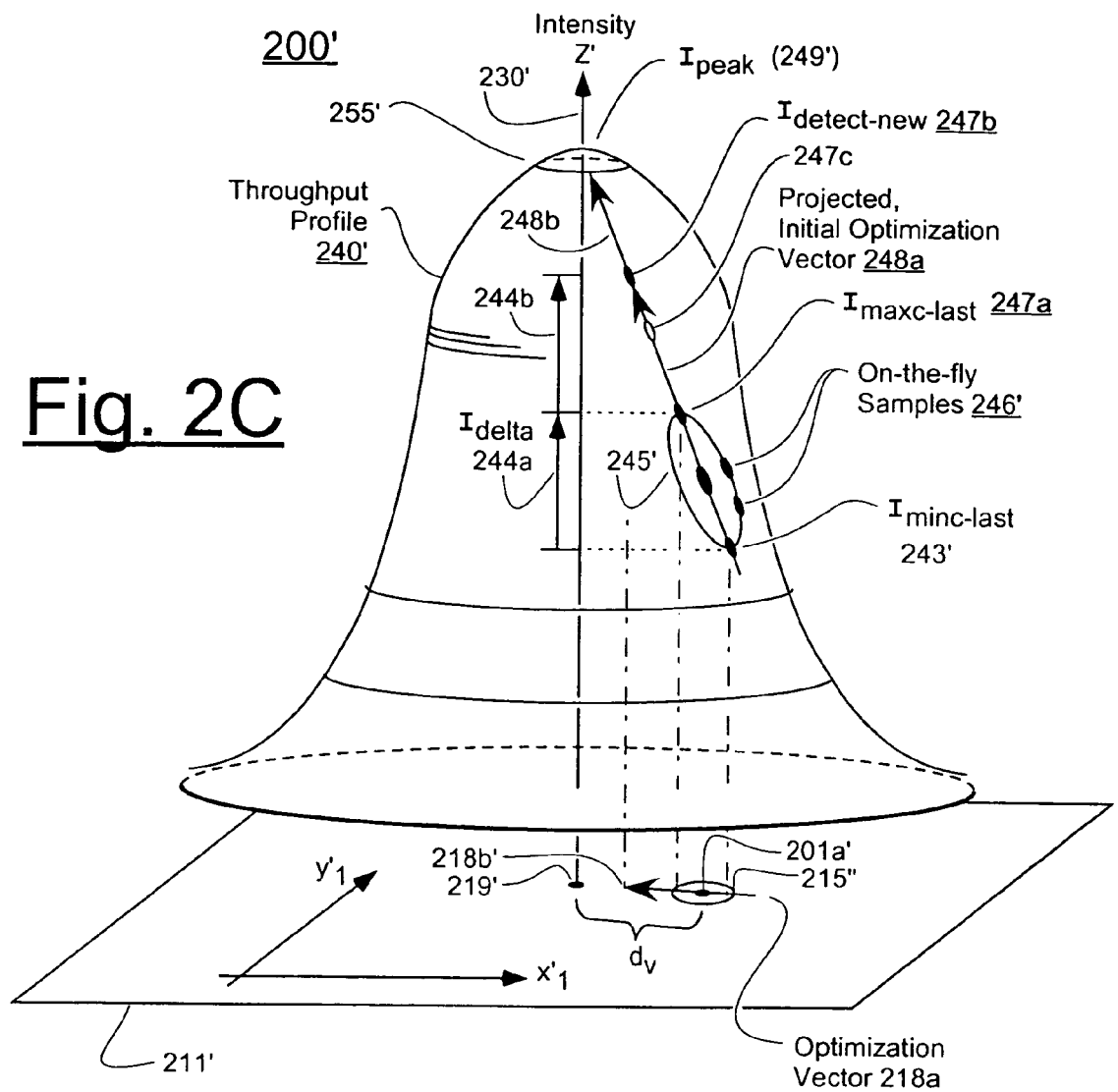
FIG. 2C is a 3-dimensional graph, similar to FIG. 2A, which shows an adjustment-vector extension operation in accordance with the disclosure.
Figure 2D:
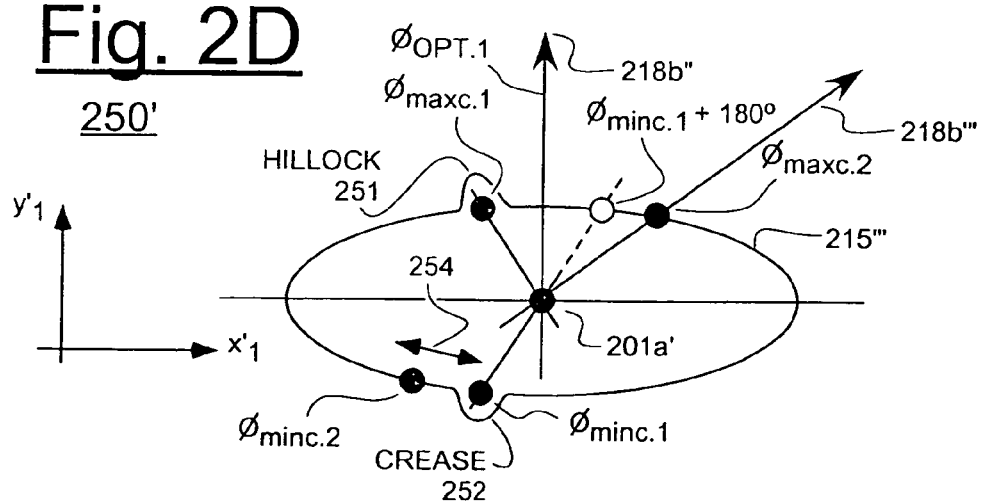
FIG. 2D is a 2-dimensional graph, similar to FIG. 2B, which shows an observation point randomizing operation in accordance with the disclosure.

A further example of how empirical derivation of G may be carried out, is to use the following equation, Eq. 2b' for determining the length of optimization vector 218:

$$d_v = G'''(R_{maxc}, R_{minc}, r, t) \cdot (I_{maxc} - I_{minc})/(I_{minc}) \quad \{\text{Eq. 2b'}\}$$

where G'''($R_{maxc}$, $R_{minc}$, r, t) is a gain factor that can vary as a function of one or more parameters such as time (t), the maximum radius ($R_{maxc}$) in the utilized dither loop/path—see FIG. 2D—, the minimum radius ($R_{minc}$) in the utilized dither loop/path and an average radius (r) in the utilized dither loop. Depending on the situation, it may be desirable to decrease G''' as time, t progresses, or conversely it may be desirable to increase G''' as time, t progresses. Similarly, it may be desirable to decrease G''' as radius, r increases, or conversely it may be desirable to increase G''' as radius, r increases.

A more general derivation of vector length $d_v$ may be expressed according to the following equation, Eq. 3:

$$d_v = f_3(I_{delta}, \text{pert}, \text{temp}, \text{time}) \quad \{\text{Eq. 3}\}$$

where $f_3(\ )$ can be a linear or nonlinear function whose parameters may include, in addition to the observed $I_{delta}$ (244), one or more loop parameters (pert) concerning the shape and/or size of the real, dithering displacement path 215, and/or one or more other parameters (temp) concerning temporary environmental conditions such as in temperature, pressure, etc., and/or one or more parameters (time) concerning temporal developments, such as historical feedback from previous determinations of $d_v$.

After the positional adjustment indicated by the derived optimization vector 218 is carried out in a corresponding alignment-improving or maintaining step, the moved part (e.g., 101a) will be positioned at the distal end point 218b of vector 218. As a result, the distal end point 218b will become the new, current position in place of old position, 201a, and the process of reciprocating, cycling or otherwise moving along or about a new, real, dithering displacement path (e.g., one like previous perturbation loop 215) may begin again with the new dithering displacement path including points that are spaced slightly away from that new position 218b. While moving along the new, dithering displacement path(s), the process of taking more, on-the-fly or other samples 246 along that new path can also be repeated. If an initially guessed-at, adjustment length value $d_v$ turns out to be too large and as a result, the vector's distal end point 218b overshoots the optimal point 219, then appropriate adjustments to the gain factor G" of Eq. 2' or to the function, $f_3(\ )$ of Eq. 3 may be made based on such experiential (historical) information and stored for future use. The historical data may be used empirically for adjusting the saturation and/or threshold levels of G''' in the case where it is a saturatable function. Also the positional-error result, $d_v$ obtained by processes such as Eq. 2b or Eq. 3 may be used as part of an integration based servo control rather than just in a proportional drive servo. The alignment improving or maintaining process may run a repeated number of times, each time from the new, post-adjustment position while using the historically-improved gain factor G" or a historically-improved de-projection function, f( ) for optimizing the overall, hill-climbing operation. If the guessed-at length $d_v$ of optimization vector 218 turns out to be too small, and as a result, distal end point 218b undershoots the optimal position 219, then the vector determining process should be repeated again with appropriate adjustment, or not, being made to G" of Eq. 2' or $f_3(\ )$ of Eq. 3.

If a given adjustment, as represented by optimization vector 218 takes the system exactly to, or substantially close to, optimum position point 219, then a next running of the perturb-and-observe process should result in a dithering around, and/or close to, a near-peak, projected perturbation loop such as shown at 255 in FIG. 2A. The $I_{delta}$ (not shown) for this new, projected perturbation loop 255 should be approximately zero. When such a state is achieved, it may be decided to not run the alignment-improving algorithm at least for a while because the system is already at or adequately close to the optimum state point 219. The perturb-and-observe algorithm may be re-run from time to time (e.g., every few seconds or minutes) and/or whenever the current intensity (which should be substantially equal to the $I_{peak}$ value (249)) drops for unknown reasons by a predefined amount (e.g., −3%) and/or drops below a predefined threshold, where such re-running of the perturb-and-observe algorithm tests to see whether the throughput profile 240 or our most current position 210a has shifted as a result of drift mechanisms such as 120 of FIG. 1. If so, the re-running of the alignment-improving algorithm should bring the fiber end (101a) or other perturbable part back into substantial alignment with the profile peak 249. Alternatively, the perturb-and-observe algorithm and the alignment-improving process may be run continuously one after the other so as to continuously assure that the perturbable part (e.g., 101a) is in substantial alignment with the profile peak 249.

Referring to the two-dimensional graph 250 shown in FIG. 2B, let us assume that the, there-shown, dithering displacement path 215' (which happens to be an elliptical perturbation loop) is being continuously cycled through and that the most maximum of the on-the-fly samples found thus far is not truly the most maximal intensity point for the illustrated perturbation loop 215'. Instead, the most maximum of the observed samples, $I_{maxc-last}$ correlates with a first angle on the perturbation loop: $\phi_{maxc}$. Let us further assume that the most minimum intensity value among the on-the-fly samples 246 taken thus far is also not truly the most minimal intensity point for perturbation loop 215' but rather that it ($I_{minc-last}$) correlates with angle $\phi_{minc}$. In such a case, we can resolve a more optimal directional angle, $\phi_{OPT}$, by finding the angle that bisects the maximum-associated angle, $\phi_{maxc}$ and a minimum-associated counter-angle, where the latter is the sum of 180 degrees plus $\phi_{minc}$ as is indicated in FIG. 2B by the dashed line and hollow, mirror point on loop 215'. The more optimal, directional angle, $\phi_{OPT}$ for the adjustment vector (218) is then defined by a line that runs through the center 201a' of the diameters of perturbation loop 215' and extends to distal point 218b' in accordance with the $d_v$ value described above.

Note with respect to FIG. 2B that the derivation of the optimal, directional angle, $\phi_{OPT}$ can be made independent of the shape and/or size of the dithering displacement path 215'. One merely needs to determine what angle or angles (or equivalent directional indicators) are associated with the initial position 201a' and at least one of $I_{maxc-last}$ and $I_{minc-last}$, where the latter two values can be found by random samplings as the perturbed part moves along (e.g., loops around) path 215'. An alignment-improving process can even be carried out in accordance with the disclosure by determining only $I_{maxc-last}$ and $\phi_{maxc}$ taken alone or by isolating only $I_{minc-last}$ and $\phi_{minc}$ taken alone and thereafter making the adjustment according to an adjustment vector 218 that extends from a known point in the perturbation loop (e.g., its center 201a') towards peak position 219 by a distance approximately equal to or less than $d_v$.

Referring to FIG. 2C, a vector-extending, hill-climbing operation in accordance with the disclosure is briefly explained. Where practical, elements of FIG. 2C are referenced alike to corresponding elements of FIG. 2A with only an apostrophe added to the reference numbers. As such, a detailed re-explanation of what each item represents is not needed. It is assumed that an initial adjustment vector 218a calculated from observations (246') made around a first projected perturbation loop 245' falls substantially short of the peak position 219', as is better seen by noting that the correspondingly projected vector 248a does not extend to the local profile peak 249'. In accordance with the vector-extension operation, one or more additional intensity observations (optionally normalized) are opportunistically made at least at one of respective points 247b and 247c (which are respectively located at the end of initial vector 248a and at an end minor portion of the initial vector 248a). If the one or more additional intensity observations, $I_{detected-new}$ (247b) are greater than the $I_{maxc-last}$ observation made on the last perturbation loop 245', then the largest of the one or more additional intensity observations, $I_{detected-new}$ is deemed as the latest $I_{maxc}$, the previous $I_{maxc-last}$ observation 247a is deemed as the latest $I_{minc}$ (and stored in memory as such), and an extension vector (represented by projected version 248b) is calculated for continuing the adjustment along the direction of the initial adjustment vector 218a. The length of the extension vector (248b) may be determined by use of any of equations, Eq. 2a', 2b', 3 or appropriate variations thereof. At the end of, or during the course of making the position adjustment represented by extension vector 248a, a yet newer one or more additional intensity observations like $I_{detected-new}$ (247b,c) may be made and the adjustment extension algorithm may be repeated until the latest $I_{delta}$ (244b) falls below a predefined threshold and/or the rate of change of the most recent $I_{delta}$ values ($\{244b-244a\}/\_t$) falls below a predefined threshold.

Referring to FIG. 2D, an observations randomizing operation in accordance with the disclosure is explained. Where practical, elements of FIG. 2D are referenced alike to corresponding elements of FIG. 2B with only an apostrophe added to the reference numbers. As such, a detailed re-explanation of what each item represents is not needed. It is possible that a throughput profile such as 240' of FIG. 2C is not completely smooth and instead exhibits certain anomalies (for whatever reason) such as misleading local maxima or flat spots (false plateaus), creases, grooves, hillocks, etc. that are not representative of the overall contour of the throughput profile (e.g., 240'). If an opportunistically made, OTF-observation (e.g., 246') happens to fall on such a contour-distorting anomaly, and that OTF-observation also happens to define at least one of the $I_{maxc}$ and $I_{minc}$ values that are to be used in calculating the adjustment vector 218a, then it is possible that the adjustment vector 218a will point in a less than optimal direction and/or have an erroneous length. It is undesirable to have such errors repeated over and over again. Therefore, in accordance with the disclosure, a randomized offset (of appropriate range of magnitude) may be included in the triggering mechanism that decides when or where to make the OTF-observations (246'). What constitutes an appropriate range of magnitude and statistical distribution for the randomized offset can vary from one context to another and thus should be empirically determined on a case by case basis.

By way of a more concrete example, assume that initially, 6 evenly spaced observations are made around a circular or elliptical perturbation loop 215''' at points represented by polar angles, 0°, 60°, 120°, 180°, 240°, and 300°. Assume further that the perturbation loop 215''' happens to lie across a contour-distorting anomaly (e.g., a hillock-crease pair: 251/252) of the associated throughput profile where the anomaly happens to run through the 0° and 180° sample points of the perturbation loop 215'''. In such a case, an anomaly-induced minimum might be found at a first location represented by angle, $\phi_{minc.1}$ (due to crease 252) and/or an anomaly-induced maximum might be found at a second location represented by angle, $\phi_{maxc.1}$ (due to hillock 251). In order to avoid such anomaly-induced problems, a random phase-angle offset 254 of say in the range −15° to +15° may be added to some or all observations made during a particular pass around a given perturbation loop (where in the case of some, those points may be randomly picked) so as to try to avoid a consistent making of OTF-observations on contour-distorting anomalies that have some form of geometric regularity. Alternatively, the random phase-angle offset 254 may be applied individually, on a different basis, to each point on the perturbation loop as may be appropriate in a particular application so as to try to avoid a consistent making of OTF-observations at contour-distorting positions of the perturbation dithering path. In the illustrated example (FIG. 2D), the randomizing phase-angle offset 254 causes randomized observations to be instead made at locations represented by angles, $\phi_{maxc.2}$ and $\phi_{minc.2}$, where the latter happen (due to their random offsets) to miss the respective, contour-distorting anomalies defined by hillock 251 and crease 252. As a result, the latter, random-driven detections of intensity maximum and minimum locations ($\phi_{maxc.2}$ and $\phi_{minc.2}$) better represent the overall contour of the throughput profile at the local of the perturbation loop 215''' and the alternate adjustment vector 218b''' (going through the $I_{maxc}$ point at $\phi_{maxc.2}$) better represent the path to the true peak 249' of the throughput profile 240'.

Referring to FIG. 3, we now describe in more detail a particular embodiment 300 in accordance with the present disclosure. Where practical, like reference numbers in the "300" century series are used in FIG. 3 for corresponding elements of FIG. 1 that are referenced therein by numbers in the "100" centuries series. In FIG. 3, excitational source 304 can be an asynchronous or synchronous binary pulse source or a continuous wave source or another such source that may have some steady-state reference level associated with it and for which reference intensity observations may be made. (It is also within the contemplation of the present disclosure to allow for a reference level that is relatively slow-changing or modulating with respect to the time scale in which opportunistic OTF-observations are made about a given perturbation loop and thus the slowly-changing reference level can be reasonably viewed as being effectively steady-state for purposes of defining an adjustment vector (218). Alternatively, the above described normalizing and/or counter-compensating measures may be taken.) Photodiode 306 feeds the correspondingly pulsed, or steady-stated modulated, or constant, light beam through fiber end 301a for reception by photodetector 302. Perturbation loop 315 includes a centerpoint ($x_{11}, y_{11}$) associated with it and a current angle, $\phi_{now}$ defined by the current position of fiber end 301a on loop 315 relative to some starting point on loop 315.

A motor driving source 355 feeds an electrical input 351 of motor 321 (M1) during a perturb-and-observe mode of the alignment-testing and improving process. Mechanical coupling 321a translates the output of motor M1 to thereby cause part 301a to cycle about the corresponding perturbation loop 315. The signal pattern of motor driving source 355 can be any appropriate one for conveniently generating the corresponding perturbation loop 315, including a sinusoidal pattern that is completely asynchronous relative to the signal pattern of excitational source 304 and completely asynchronous relative to a sampling clock 308c (to be described shortly). The signal pattern of motor driving source 355 can change in frequency and/or waveshape over time. The signal pattern of motor driving source 355 can alternatively be digital instead of analog and can change in pulse rate or pulse width over time. Motor M1 may include piezoelectric elements, electromagnetic elements, magnetostrictive elements, electrostrictive elements, electrostatic elements, thermally-strained elements, other strain-induced elements, pneumatic elements, hydraulic elements, magnetic elements, and/or the like for providing fine movement for producing perturbation loop 315 during the perturb-and-observe mode. Motor M1 may use the same or other elements for providing coarse movement for moving fiber end 301a to a more optimal location during a subsequent, adjust mode. The motor means M1 may additionally or alternatively include x-y transducers or drivers which may be respectively energized by sine wave and cosine wave energization signals for producing elliptical, circular, or other perturbation loop patterns. The sinusoidal energization signals for the x-y transducers may be derived from 50 Hz or 60 Hz or 400 Hz line current, or from other available sources as may be appropriate.

A primary goal for motor driving source 355 and motor means M1 is to allow for the making of a distributed set of intensity observations (intensity samples) at pre-specified points and/or on-the-fly, opportunistically selected points about perturbation loop 315 (with or without randomized shift 254 of such observation points—explained below) so that samples may be effectively taken at or close to the positions of the true $I_{max}$ and/or $I_{min}$ points on the projected perturbation loop 245 (FIG. 2A) to thereby find the corresponding positional states of approximately maximum and minimum coupling efficiency (or stated otherwise, of greatest and least radiative influence coupling factors along the perturbation dithering path). A secondary goal for motor driving source 355 and motor means M1 is to allow for a natural perturbation loop 315 that is not excessively damped by mechanical characteristics of the system and is not excessively encouraged by positive-feedback characteristics (e.g., harmonic build up) of the system. Other goals for motor driving source 355 and motor means M1 may be established and complied with depending on the specific context in which the perturb-and-observe mode and the adjust mode of the alignment-improving process take place. For example, if perturbable part 301a is inside a curing-epoxy, there may be certain perturbation frequencies and/or waveshapes that should be avoided in order to not interfere with the curing process. As another example, if perturbable part 301a is inside an active communications system which has certain time periods during which certain perturbation frequencies and/or waveshapes of loop 315 are to be suppressed, then motor driving source 355 and motor means M1 may be designed accordingly. The main point being made here is that the ability of the alignment-improving system to work with intensity observations that are opportunistically made on-the-fly (whether on an essentially random basis or at pre-planned time points and/or over pre-planned locations of the dithering displacement path) and that such flexibility regarding when and/or where the sampling observations will be made provides system designers with room for varying how they will design the motor driving source 355 and the motor means M1.

Transducer interface circuit 308a converts the detection signal produced by photodetector 302 into a first digital signal, $I_{detected}$ that represents the detected magnitude of throughput intensity either absolutely or in relative terms. Optionally, interface circuit 308a may include a normalizing function that adjusts the conversion gain of 308a to counter compensate for slow modulations of the radiation source signal 306 and thereby causes $I_{detected}$ to provide a better representation of the radiation coupling efficiency between elements 301a and 302. The first digital signal, $I_{detected}$ (optionally normalized) may be repeatedly produced on a sampled basis as is indicated schematically by sampling switch 308b and sampling clock 308c. (As already explained above, the sampling clock 308c may be selected to work in phase with a source 304 that modulates the source-side intensity emitted from the perturbable part 301a and to thereby "mask" part or all of that intensity modulation from being "seen" by the intensity detecting circuitry 390.) The samples of this first, digitally-sampled (308b) signal, $I_{detected}$ are coupled to D inputs of one or more, intensity-capturing registers such as 361 and 364. If appropriate, sampling clock 308c may be completely asynchronous relative to perturbation drive 355. Thus, samples may deemed as being taken randomly on-the-fly because there is no need for drive 355 and/or motor means 321 (M1) to be in a stopped mode and/or in a mode that assures radiating end 301a is in a particular position at a particular time point. In other words, if it is so desired, the on-the-fly taken, intensity samples may be randomly placed on real perturbation loop 315. (On the other hand, if system designers want one or more of the OTF-observations to be made at specific points along a pre-specified loop segment or along the whole loop 315, such non-random samplings can also be accommodated by the intensity detecting circuitry 390.)

Referring first to the upper register 361 in FIG. 3, a trigger circuit 309 may be provided for testing the $I_{detected}$ samples and supplying a logic "1" to the clock-enable input (CLKEN) of register 361 when $I_{detected}$ is found to be in a predefined, valid range such as being greater than zero (or such as being greater than another, prespecified and negligible minimum value while being below another, prespecified and excessive maximum value). One or more randomizers such as the one shown at 349c may be used to randomly perturb at least partially the trigger range of trigger circuits such as 309–349c and to thereby implement the observation point randomizing method represented by item 254 of FIG. 2D. Comparator 371 compares the current value of $I_{detected}$ on line 310 against a previously stored value of $I_{detected}$ where the previous value is represented by the $I_{maxc}$ signal output from the Q terminal of register 361. If the currently observed intensity (310) is greater than the previous, stored as-maximum intensity sample, $I_{maxc}$, then comparator 371 activates clock line 311 and thereby causes the first register 361 to capture the current intensity signal 310 (if CLKEN=1) and to store it as the new $I_{maxc}$ signal that is to be the next output from the Q terminal of register 361. (When system 300 is first initialized or later re-initialized, a reset signal, RST, may be applied to the reset terminal, R of register 361 to thereby cause the initial value of $I_{maxc}$ to be zero. If $I_{maxc}$ continues as 0, it may be assumed that an in-range sampling of $I_{detected}$ has not yet taken place.) At the same time that register 361 is being updated with the new, to-be-stored as-maximum intensity signal on line 310, the previously-stored $I_{maxc}$ signal is shifted from first register 361 into a second register, 381. Similarly, a yet-older $I_{maxo}$ signal may be shifted from second register 381 into a historical, third register 391 and, if desired, this shifting may continue into yet other historical registers which are not shown. Thus, a historical shift register can be defined by registers 361, 381, 391, etc., for keeping track of the currently stored as-maximum intensity signal and also for keeping track of previous ones of the sampled intensity levels 310 that earlier qualified as largest-thus-far samples. Rotating pointers (not shown) may be alternatively employed for respectively pointing to a current top of stack, a current bottom of stack and to middle parts of a stack memory (not shown) as appropriate and for thereby providing an equivalent function. (Although the sampling operation is being described with a hardware-flavored embodiment 390, it is within the scope of this disclosure to carry out parts or all of such sample-taking and sample analysis operations in a general-purpose or special purpose computer having software adapted for performing substantially similar functions, even if somewhat slower than what could be done in a more hardware-flavored embodiment.)

At, or roughly about the same time that comparator 371 activates clock line 311, the comparator 371 also activates clock line 312 which connects to the clock input of fourth register 362. The CLKEN terminal of register 362 is coupled to the output of trigger (filter) circuit 309. In response to activation of its CLK and CLKEN inputs, the fourth register, 362 captures a current, observed-angle signal, $\phi_{obsd}$ presented on line 316. At the same time, previously stored values of the observed angle $\phi_{Imaxc}$, $\phi_{Imaxo}$, etc., may be shifted into the historical shift register means formed by registers 382, 392, etc. Rotating pointers (not shown) may be alternatively employed for respectively pointing to current top, bottom and middle parts of a stack memory (not shown) and for thereby providing an equivalent function respecting the observed-angle signals. The $\phi_{obsd}$ signal (316) represents the perturbation loop sweeping-angle that corresponds with the currently-detected intensity signal $I_{detected}$ (310). As a result of these actions, the Q outputs of registers 361 and 362, respectively, represent the currently-stored value of what is believed to be the greatest detected intensity thus far, $I_{maxc}$ and its associated angle $\phi_{Imaxc}$ A similar relationship exists for the intensity and angle values stored in registers 381 and 382, 391 and 392, etc.

The current, observed-angle signal $\phi_{obsd}$ may be developed on line 316 in a number of different ways. (Line 316, incidentally, can be a multi-wire bus for carrying an appropriate number of bits in parallel and/or serially as may also be line 310 and other lines which carry signals representing multi-bit values.) One way that the observed-angle signal ($\phi_{obsd}$) may be developed is by providing an appropriate transducer (not shown because there can be many different kinds, optical, magnetic, piezoelectric, etc.) and connecting that transducer to the mechanical coupling 321a such that the current angle, $\phi_{now}$ on the perturbation loop 315 is converted directly into the $\phi_{obsd}$ signal 316. Under another approach, a transform function $f(\phi_{now})$ may be found to exist between perturbation driving signal 355 and the actual angle $\phi_{now}$ on the perturbation loop. Signal 355 may be coupled to an inverse function unit 358 ($f^{-1}(\ )$) which then outputs the $\phi_{obsd}$ signal as a close approximation of, or an accurate representation of, $\phi_{now}$. (The angle transform function $f(\phi_{now})$, incidentally, is not related to the vector function $f_3(\ )$ of above equation, Eq. 3.) Appropriate time delays may be implemented in the transducer interface circuitry 308a–c and/or in the inverse function circuit 358 so that the current $I_{detected}$ signal on line 310 corresponds closely with the current $\phi_{obsd}$ signal 316 and vice versa, as do the correspondingly represented, physical quantities of radiation intensity detected by detector 302 and the actual angle, $\phi_{now}$.

Respective registers 364 and 363 may be configured to respectively output the current, known-to-be-minimum intensity signal, $I_{minc}$ and its corresponding angle, $\phi_{Iminc}$ in a similar manner. Trigger (or filter) circuit 349 (with or without the optional, range randomizing circuit 349c—any random or pseudo-random source may be used as may be appropriate) defines what range of $I_{detected}$ (316) constitutes a valid range of magnitudes for developing the $I_{minc}$ signal and its related angle signal, $\phi_{Iminc}$. If the valid range of trigger circuit 349 is the same as that for trigger circuit 309, then the two trigger circuits can be combined into a single circuit. Upon initialization of the system for carrying out a new perturb-and-observe mode, reset signal RST may be used to reset register 363 while at the same time setting (S) register 364 to the register's maximum value. Comparator 374 determines whether the current $I_{detected}$ signal (310) represents an intensity (and/or corresponding coupling efficiency) that is less than that of the stored $I_{minc}$ signal. If yes, then comparator 374 activates clock line 314 to cause register 364 to capture the current $I_{detected}$ signal (310) as the new minimum, while the previous minimum is shifted into register 384 and the previous contents of register 384 are shifted into register 394, and so forth. At or about the same time, clock line 313 is activated to cause register 363 to capture the current $\phi_{obsd}$ signal (316) as the angle that is associated with the $I_{detected}$ signal being captured by register 364. At the same time, older historical values for the corresponding older intensity values may be shifted into a shift register formed by registers 383, 393, etc. Rotating pointers (not shown) may be alternatively employed for respectively pointing to current top, bottom and middle parts of a stack memory (not shown) and for thereby providing an equivalent function respecting the thus-far, most-minimum $I_{minc}$ signals and their correspondingly observed-angle signals, $\phi_{Iminc}$.

In an embodiment that implements radius-based, vector calculation (where such radius-based calculation is represented by above equations, Eq. 2b, 2b', 3 or appropriate variations thereof), it may be desirable to record other coordinate parameters such as a current-radius, $R_{obsd}$ associated with the observed-angle signal ($\phi_{obsd}$,316) and the current $I_{detected}$ signal magnitude which is being recorded as representing the latest $I_{maxc}$ or $I_{minc}$ (and correspondingly, the latest maximum and minimum coupling efficiencies found thus far). The circuitry (and/or computer software) for recording such a current-radius, $R_{obsd}$ and appropriately associating it with the latest $I_{maxc}$ or $I_{minc}$, and/or keeping a historical record of it can be similar to the circuitry (e.g., 362/363, 382/383, 392/393) shown for doing the same with the observed-angle signal ($\phi_{obsd}$,316). To avoid illustrative clutter that additional circuitry for recording $R_{obsd}$ and/or tracking its history is implied by input-coupling 317 rather than being fully shown.

In similar fashion to the way the observed-angle signal ($\phi_{obsd}$,316) either by direct measurement ($\phi_{now}$) or by predictive transformation (358), the radius length value, $R_{obsd}$ which is associated with the currently-detected intensity, $I_{detected}$, can be directly measured through appropriate means and the measurement can be supplied to input-coupling 317 or a predictive transformation (analogous to 358) may be made from the electrical input 351 of motor 321 (M1) to closely approximate what $R_{obsd}$ is to be expected with the associated, currently-detected intensity, $I_{detected}$, and this predictive evaluation of $R_{obsd}$ can be supplied to input-coupling 317. The current and historical recordings of the $R_{obsd}$ values associated with respective ones of the $I_{maxc}$ and $I_{minc}$ values and/or respective ones of the $\phi_{Imaxc}$ and $\phi_{Iminc}$ values may be delivered to a peak locator circuit 350, which as shall now be explained, analyzes the delivered data and generates one or more vector signals representing vectors (218b) that extend from the current perturbation centerpoint ($x_{11},y_{11}$) to what is believed to be the $I_{peak}$ point (219,219').

The illustrated peak locator circuit 350 may be integrally provided for receiving the Q outputs of respective registers 361–364, and for responsively generating an adjustment direction-and-distance signal (representing adjustment vector 218). During an adjust mode of the alignment-improving process carried out by system 300, the adjustment direction-and-distance signal may be output on line 356 and coupled to the first motor means 321 (M1) so as to indicate to motor means 321 what direction to travel in to reach the modal peak position (219 of FIG. 2A) and what distance to travel for reaching that new position. A programmably-controllable, switching means 357 (controlled by the peak locator 350 or by another appropriate circuit) selectively connects the first motor means 321 to at least one of the perturbation drive source 355 or to the adjustment signal 356 at appropriate times. The switching means 357 may selectively connect the first motor means 321 to further mode controls (e.g., a hold-position mode control line and/or a continue-extending-the-adjust-vector mode line—not separately shown) at appropriate times. As an alternative to moving the perturbable part 301a directly to the position 219 associated with $I_{peak}$, the drive signal 356 provided by the peak locator circuit 350 may instead move the perturbable part 301a to a pre-alignment position which is spaced away from the calculated optimum point 219 such that one or more drift mechanisms (e.g., cooling solder and/or curing epoxy) will carry the perturbable part 301a the rest of the way to the calculated optimum position 219 as the mechanical system in which the perturbable part 301a resides, settles into an ambient defined, steady state.

The historical information which was saved in the shift register formed by, for example, registers 381, 391, etc., and 382, 392, etc., may be used by the peak locator 350 for determining when to exit the perturb-and-observe mode (POM) and subsequently enter the adjustment execution mode (AEM). Comparators such as those shown in group 359 of the peak locator circuit 350 may be used to compare the current known-to-be-maximum signal $I_{maxc}$ against the previous one $I_{maxo}$ (older known-to-be-max) to see if the difference between the two is less than a predefined threshold amount. Another comparator in group 359 may compares $I_{maxo}$ to $I_{maxo-1}$ to see whether the current delta in intensities ($I_{maxc}-I_{maxo}$) is saturating relative to the older intensity deltas ($I_{maxo}-I_{maxo-1}$), by for example comparing their difference against a predefined threshold amount. Further ones of comparators in comparator group 359 can perform similar operations for the current and previous angle signals, $\phi I_{maxc}$, $\phi I_{maxo}$, etc. Yet further ones of comparators in comparator group 359 may perform similar delta evaluation and saturation evaluation functions for the signals associated with the intensity minimums and their corresponding angles. When the various deltas and/or saturation slopes that are tracked by comparator group 359 fall below respective and pre-defined thresholds, the peak locator circuit 350 can signal switch 357 to exit the perturb-and-observe mode (POM) and to enter the adjustment execution mode (AEM). Alternatively or supplementally, the switch out from POM may be activated by a POM limit timer (not shown) provided in unit 350.

The saved historical information (e.g., of registers 381/391, 382/392, 383/393, etc) may additionally or alternatively be used for adaptively adjusting the correction feedback gain factor G' (of equations such as Eq. 2a' or Eq. 2b') so as to help the system to more optimally (e.g., more quickly, more economically) achieve alignment in a next running of the perturb/observe and adjust modes given experience obtained in earlier runnings of the same. The saved historical information (e.g., of registers 381/391, 382/392, 383/393, etc) may additionally or alternatively be used for adaptively adjusting the perturbation loop radius (or radii) in view of information collected regarding use of earlier radii ($R_{obsd}$, 317) so as to help the system to more optimally (e.g., more quickly, more economically) achieve alignment in a next running of the perturb/observe and adjust modes given experience obtained in earlier runnings of the same. For example, computer analysis of historical data may show that radii values in certain ranges are associated with fewer numbers successive runnings of the perturb/observe and adjust modes, which may indicate that such radii values can be statistically associated with more efficient implementations of the alignment process. Subsequent runnings of the perturb/observe mode may be adjusted to preferentially use radii in such ranges (in other words, to adaptively adjust the size and/or shape of the perturbation loop 315 so as to optimize the alignment process).

The saved historical information (e.g., of registers 381/391, 382/392, 383/393, etc) may additionally or alternatively be used for adaptively adjusting other operating parameters of the alignment system. More specifically, besides automatic gain control, the other operating parameters which are adjusted in response to saved historical information may include: upper and/or lower limits or thresholds which are re-adjusted in view of the historical information. Additive or integrated gain adjustment may be utilized, for example to overcome stiction problems. The historical information may be used to provide the system with better stability as it converges on positional state solutions. The historical information may be used in the selection or adjustment of filter functions, as may be appropriate for minimizing the time of alignment and/or minimizing undesirable overshoots, oscillations and other such positioning anomalies. Various servo techniques are known to those skilled in the art of servo control for taking advantage of saved historical information, and in the case of the saved data (e.g., of registers 381/391, 382/392, 383/393, etc) such historical data may be advantageously used for servo control.

The saved historical information (e.g., of registers 381/391, 382/392, 383/393, etc) may additionally or alternatively be used for adaptively identifying variations in the detected intensity signal ($I_{detected}$) that are unrelated to alignment drift (e.g., which condition may be deduced if the subsequent runnings of the perturb/observe and adjust modes are found to be bringing the perturbable part 301a back to its point of origin). Such identified, false-positive variations may subsequently be filtered out from the input data (310) so as to avoid executing the perturb/observe and adjust modes when they are not needed. This can help save energy and reduce unnecessary disruptions to the optical train.

The saved historical information (e.g., of registers 381/391, 382/392, 383/393, etc.) may additionally or alternatively be used for adaptively detecting historical trends in error direction or error magnitude and proactively taking countermeasures against such historically-recognizable trends. More specifically, if the saved historical information (e.g., of registers 381/391, 382/392, 383/393, etc.) is scanned by a computer or another intelligent device and the intelligent device automatically determines that alignment has been monotonically shifting in a consistent direction approximately, say N nanometers every second (e.g., due to epoxy or solder cooling dynamics), then the intelligent device can proactively command one or more counter-motions by the alignment motor means prior to the carrying out of each successive dithering motion so as to thereby reduce the correction movement needed for successive passes. Of course, in such cases, the intelligent device (e.g., computer) will recognize that the newly saved, historical information is constituted by deltas built on top of the proactive counter-motions and the intelligent device will appropriately treat that newly saved, historical information accordingly. Alternatively or additionally, if the proactive counter-motions developed from one instantiation of the process are transferable to other instantiations because of similar environmental conditions, etc., (e.g., a plurality of photodiodes curing in separate epoxy containers but at same temperature, humidity, etc.) then the steps of saving and analyzing historical data for each of the similar instantiations may be bypassed and the proactive results developed by one exemplary instantiation may be applied to all the rest of the similar instantiations. Similarly, if process or environmental conditions are such that a particular drift motion can be predicted based on experience with earlier instantiations, then proactive counter-motions can be commanded on a feedforward basis to future runs where the commanded counter-motions are derived from one or more of theoretical, empirical and pre-modeled information developed for the devices that are being aligned.

At about the same time that a given perturb-and-observe mode (POM) is being terminated (or afterwards), the peak locator circuit 350 may derive the adjustment direction-and-distance signal 356 from the current Q outputs of registers 361–364. After the adjustment execution mode (AEM) completes and the perturbable part 301a has been moved by motor means 321 to the new position (218b) indicated by the adjustment direction-and-distance signal 356, the peak locating circuitry 390 that is formed by registers 361–364, etc., and peak locator circuit 350 may be reset (RST) and switch 357 may be returned to the perturb-and-observe mode (POM) for thereby testing the new, and now current position of moved part 301a to see how close to optimum (219) it is.

Maximum and minimum determining circuitry such as represented by registers 361–364, comparators 371–374 and peak locator 350 can be constructed from relatively simple logic gates and therefore can be easily implemented integrally and monolithically within a field programmable gate array (FPGA 390) or another form of programmable logic (e.g., DSP, as microcode or higher level code in a microcomputer, a micro-controller, a sequencer, etc.) if desired. The integrally and programmably-implemented circuitry and/or logic 390 (e.g., FPGA, DSP, etc.) may be updated and reconfigured as appropriate to improve its performance in view of historical information obtained from previous runs of the alignment-improving process. The illustrated peak-locating and/or alignment adjusting system 300 may be integrally incorporated into a monolithic or other optoelectronic module that further has reflective components (e.g., mirrors) and/or waveguiding components that may directly or indirectly benefit from periodic alignment with yet other optical components. By way of example, the integrated optical components may adjustably steer a radiation signal (e.g., optical beam) so as to provide optimized coupling efficiency between the steered signal and one or more elements to which the signal alignably couples.

FPGA or DSP implemented circuits such as 390 tend to be relatively small and inexpensive. Accordingly, many of these can be implemented in a compact and relatively inexpensive way for carrying out the alignment-improving process at many different stations and/or for a plurality of adjustable variables at each station. For example, in FIG. 1, after the first motor means 121 drives fiber end 101*a* to a corresponding point of improved alignment on reference coordinate surface 111, that first motor means 121 can be placed into a position-holding mode while the second motor means 122 is activated to perturb fiber cross-sectional part 101*b* and thereafter move that fiber portion 101*b* to an improved position on reference coordinate surface 112. Next, M1 may be reactivated into the POM and AEM modes in order to find yet a better position on SURFACE #1 while M2 is on hold. Subsequently, M2 may be reactivated into its respective POM and AEM modes so as to converge towards an even better angle of incidence for the fiber 101 that is undergoing position adjustment. Although not shown, a third motor means may be coupled to the material in the coupling region 103 for improving the state of that coupling region 103 to thereby further improve energy coupling between fiber 101 and photodetector 102. Yet other motor means (also not shown) may be similarly driven by similar, on-the-fly (OTF) alignment control units (150) for adjusting the alignment of other radiation-carrying elements that carry radiation signal 105 ultimately to detector 102.

With appropriate integration of logic functions, one of the tasks that may be carried out by the peak locator 350 (or another circuit) is to determine whether the optimization angle, $\phi_{OPT}$ (see FIG. 2B) that had been derived from older values of intensity and angle is about the same as the optimization angle being produced for a next-to-be executed, adjust mode from the most current, POM-produced set of maximum and minimum intensity values and their corresponding angle values. If the latest $\phi_{OPT}$ is about the same as the immediately previous optimization angle used in the last execution of the adjust mode (AEM), such a condition may indicate that system 300 is stepping in relatively small increments towards the optimal peak position 219 rather than more appropriately using larger distance values ($d_v$). In response to such an indication, the peak locator circuit 350 may increase the effective gain (e.g., the G' in Eq. 2) that is used for generating the distance part of adjustment signal 356. On the other hand, if the newest value for $\phi_{OPT}$ is roughly 180 degrees apart from the previous value for $\phi_{OPT}$ then that condition may indicate that system 300 had overshot the optimum position 219 in its execution of the last adjust mode (AEM). In response to this occurring, the peak locator circuit 350 may electively reduce the variable gain value that it uses for calculating the vector length $d_v$ that is represented by the adjustment signal 356. The historically-adjusted gain values may be stored in memory (not shown in FIG. 3) for use in subsequent derivations of the adjustment vector 218.

Figure 4:
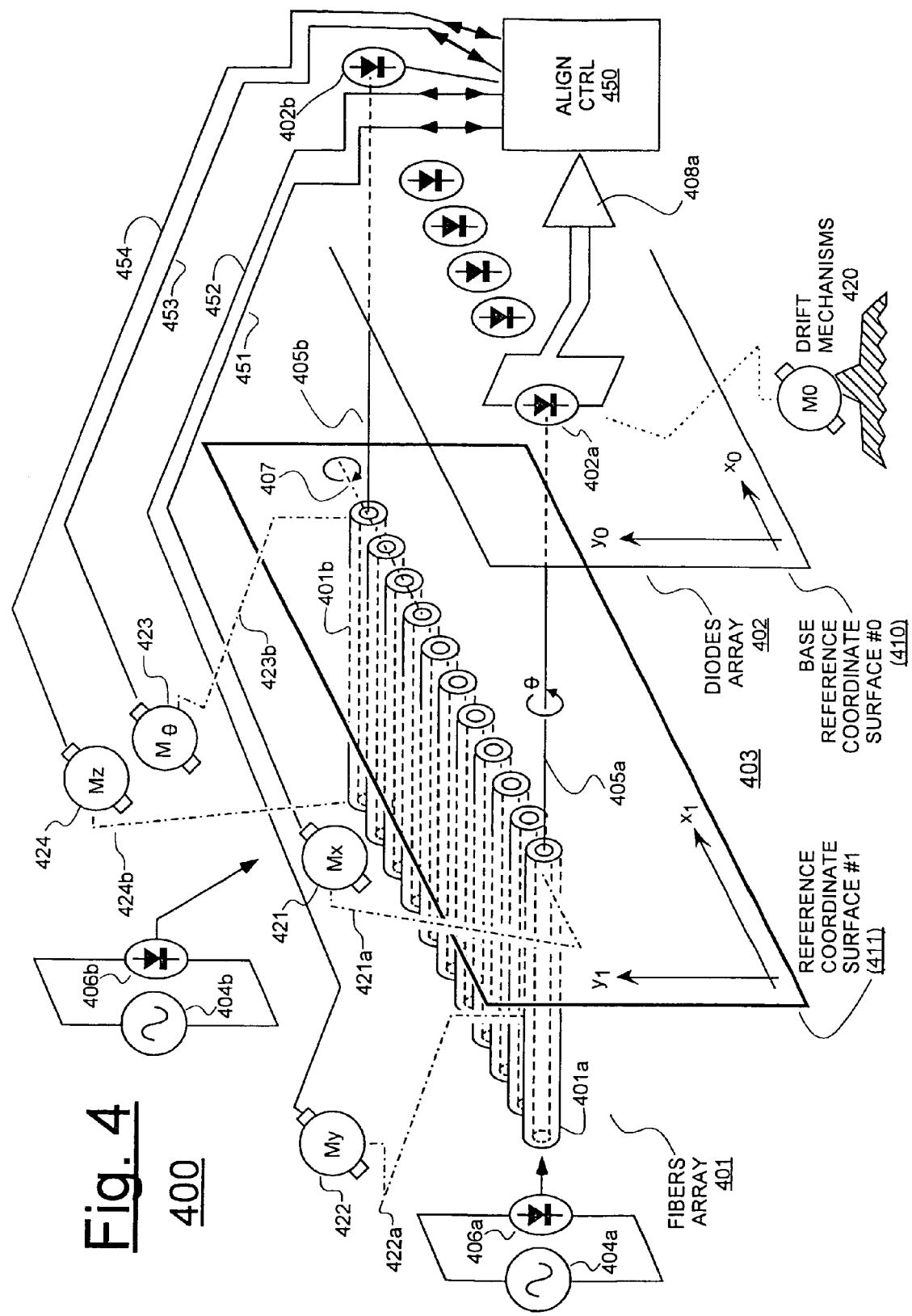
FIG. 4 is perspective diagram of a second alignment system that may be implemented in accordance with the present disclosure.

Because of its simplicity and relatively small size, the on-the-fly (OTF) adjustment circuitry 390 of FIG. 3 or equivalents thereof can be readily integrated into a wide variety of systems for which it was impractical to integrate prior types of active-alignment subsystems. FIG. 4 shows a first example of a system 400 where a linear array 401 of optical fibers can be actively aligned to a corresponding, linear array 402 of photodiodes. Where practical, like reference numbers in the "400" century series are used in FIG. 4 for corresponding elements of FIG. 1 that are referenced therein by numbers in the "100" centuries series. In system 400, a first reference optical signal 405*a* is sent from an exemplary, reference source unit such as 404*a*–406*a* through a first fiber 401*a* located at or near a first end of the fiber array 401. The first reference beam 405*a* is to be detected by a respective first photodiode 402*a* at or near a corresponding first end of the diodes array 402. A second reference optical signal 405*b* is sent from another exemplary source unit such as 404*b*–406*b* through a second fiber 401*b* located at or near an opposed second end of the fiber array 401. The second reference beam 405*b* is to be detected by a respective second photodiode 402*b* located at or near a corresponding second end of the diodes array 402.

Motor means, $M_x$ (421) and $M_y$ (422) are provided to perturb and move the detector-proximal end of fiber 401*a* along reference surface 411 and to thereby actively align the first fiber to the first photodiode in accordance with the techniques described above for FIGS. 2A, 2B and 3. A third motor means $M_\theta$ (423) is provided for rotating the linear fiber array 401 by an angle θ that is centered about the longitudinal axis (405*a*) of the first optical fiber. The third motor means $M_\theta$ (423) may be activated to perturb and move the second optical fiber 401*b* so that the second fiber 401*b* is better aligned with corresponding second photodiode 402*b* after the first fiber 401*a* and photodiode 402*a* have been aligned. A fourth motor means $M_z$ (424) is provided for rotating the linear fiber array 401 by an angle of incidence, where measurement of that angle is centered about a lateral axis 407 of the optical fiber array and where axis 407 is orthogonal to optical axis 405*b*. The fourth motor means $M_z$ (424) may be activated to perturb and move the back part (detector distal part) of the fiber array 401 so that the angle of incidence of array 401 relative to reference surface 411 is substantially optimized for thereby substantially maximizing energy coupling efficiency between arrays 401–402. This global optimization may occur after the individual couplings of the first fiber/photodiode pair 401*a*–402*a* and the second fiber/photodiode pair 401*b*–402*b* have been optimized. (In an alternate embodiment, the fourth motor means 424 may be operating simultaneously with one or more of the first through third motor means 421–423 and an associated, OTF alignment control unit 450 {described shortly} outputs multi-dimensional control signals 451–454 for invoking multi-dimensional movement of a solid object such as linear array 401.) The system 400 can switch back and forth between the individual realigning of the first fiber/photodiode pair 401*a*–402*a* and then the individual realigning of the second fiber/photodiode pair 401*b*–402*b* and thereafter the common readjustment of the incidence angle (407) until an optimal coupling state is obtained at least for fiber/diode pairs 401*a*–402*a* and 401*b*–402*b*. By implication, the coupling states of the remaining fiber/diode pairs of respective arrays 401 and 402 should be optimized at the same time if arrays 401 and 402 are linear and their elements are distributed uniformly or in accordance with another counterpart distribution.

While, for simplicity's sake, FIG. 4 shows the perturbable part 401 as having a linear array of fiber ends, it is within the contemplation of the present disclosure to have more complex arrangements such as wherein the radiation emitting and/or receiving elements (e.g., fiber ends) are distributed two-dimensionally across a real or virtual surface (e.g., 411) or are distributed in some manner, three-dimensionally within a given volume, and where the respective two-dimensional real or virtual surface or the three-dimensional volume is movable and/or where the individual radiation emitting and/or receiving elements are individually moveable to some extent along/within their respective two-dimensional or three-dimensional support means (e.g., 411). In such cases, the OTF alignment control unit 450 may output both group and individual perturbation control signals for moving the respective elements through respective perturbation loops and the alignment control unit 450 may further output both group and individual alignment control signals for responsively moving the elements as a respective one or more groups and/or individually to bring the respective elements (e.g., fiber ends) into alignment with counterpart optical components (e.g., diodes in array 402).

Although in FIG. 4, all of motor means 421–424 are shown as being respectively coupled mechanically (421a, 422a, 423b, 424b) solely to the fiber array 401, it is within the contemplation of the present disclosure to instead mechanically couple all of motor means 421–424 solely to the diode array 402; and/or to use a subset of the illustrated motor means 421–424 for providing a more limited form of active alignment (coupling optimization) and/or to instead mechanically couple some of motor means 421–424 to diode array 402 while leaving others mechanically coupled to fiber array 401. It is to be understood that the OTF alignment control unit 450 receives the detected reference intensities output by diodes such as 401a, 401b; and transmits respective, perturb-mode and adjustment mode control signals to the respective motor means 421–424 in accordance with the techniques disclosed herein. For an array-common perturb-and-adjust cycle such as that carried out by the fourth motor means $M_z$ (424), the feedback intensity profile (e.g., 240 of FIG. 2A) may be developed as a weighted or unweighted average of the individual throughput profiles of two or more diodes in array 402. Of course, the illustrative, fibers array 401 and diodes array 402 may be each or both replaced by arrays of other kinds of radiation supplying and/or receiving devices, and of course, changes to the types of respective motor means 421–424 used (e.g., electrostatic, electromagnetic, piezoelectric, magnetostrictive, linear, rotative, etc.) and changes to the corresponding mechanical couplings used (421a, 422a, 423b, 424b) may be made as appropriate to the context of use. More specifically, hexapod mechanical actuation or other such alternatives may be used in place of two or more of the illustrated actuation means.

One context in which active alignment is particularly useful is that where the energy output of the utilized radiation supplying devices (e.g., laser diodes) is limited due to thermal budget and/or power budget considerations or the like. Such considerations can come into play in highly-integrated systems where the size and/or allowed energy draw of a radiation source is often relatively small, and therefore the maintaining of optimal alignment of radiation supplying devices with radiation receiving devices is important for maintaining a desired level of operational performance. Another context in which active alignment may be useful is that where the energy output of the utilized radiation supplying devices is dangerously high (e.g., to eye safety, as may be the case with certain, fiberless interconnect schemes) and it may be advisable to persistently assure that beams are being directed to only where intended rather than drifting out of alignment due to any of a host of possible drift mechanisms.

The multi-channel system 400 of FIG. 4 can be operated to provide simultaneous correction in more than two dimensions at a time (e.g., moving a single point like the radiative end of fiber 401a to a new X, Y location on surface 411) as follows. While fiber array 401 is being moved along a set of perturbation loops that are respectively traced out on reference surface 411 by respective ends of fibers such as 401a and 401b, the $I_{maxc}$ and/or $I_{minc}$ values and positions on the respective perturbation loops are determined substantially at the same time for two or more of the radiation-carrying channels (e.g., fibers 401a and 401b). Just as stereoscopic viewing of two slightly different, two-dimensional pictures can produce information with three-dimensional content, the multi-channel, on-the-fly observations of the $I_{maxc}$ and/or $I_{minc}$ values and positions on the respective perturbation loops can be used to generate correction vectors that operate in three or more dimensions (e.g., X, Y, Z, θ) rather than in just two. More specifically, it is rare that the optical axes of a multi-axis system are in alignment with the mechanical rotation axes of system. For example, it is unlikely that a rotation by the $M_θ$ motor (423) will center perfectly around optical axis 405a. Accordingly, each time that a delta-theta adjustment is tried by actuating only motor 423 at the time, x or y axis errors will be inherently introduced due to the non-coincidence of the mechanical and optical axes (those schematically represented by line 405a). The amount of non-coincidence can be found though and simultaneously compensated for while a delta-theta adjustment is carried out. More specifically, assume that in a first carrying out of a delta-theta adjustment, only the $M_θ$ motor (423) is used. Thereafter, only the $M_y$ motor 422 is used in sequence to re-align fibers 401a and 401b along the y-axis and to the optical axis of diodes 402a and 402b. Assume that re-alignment of 401a to 402a involves a 2 μm shift in the y-direction. Assume that re-alignment of 401b to 402b involves a 10 μm shift in the y-direction. Those two pieces of information allow the system to automatically determine what degree of non-coincidence exists between the mechanical and optical axes which are schematically represented in FIG. 4 by line 405a. Then, the next time a delta-theta adjustment is made, the $M_θ$ motor (423) is not used by itself. Instead, the $M_x$ (421) and/or $M_y$ motor (422) are simultaneously actuated so as to simultaneously correct for the misalignment or non-coincidence between the mechanical and optical axes represented by line 405a to the extent practical. The procedure may be repeated a number of times to map out a correction database for the theta space in terms of correcting delta-x and delta-y values. Once such a database for simultaneous multi-axis correction is formed, optical alignment of the full array can be more quickly achieved.

The multi-channel system 400 of FIG. 4 can be operated to provide additional information about the physical separation distance in the Z-direction between fibers array 410 and diodes array 402 (or other such, 3-dimensionally spaced systems). Conventionally, two or more throughput profiles similar to that of FIG. 2A are plotted while the physical Z separation between elements is changed for each of the profiles. Ray tracing and/or estimation are then used to backplot to a theoretical point of convergence. The system 400 of FIG. 4 includes a Z-position modulator (e.g., 424) as well as X-position and Y-position modulation means (e.g., 421, 422). The alignment control module 450 is understood to include a history-recording memory. The data in the history-recording memory (not directly shown, understood to be inside 450) can be organized to represent mappings of different throughput profiles at respective separation distances if the Z-position modulator (e.g., 424) is dithered in combination with dithering of the X-position and Y-position modulation means (e.g., 421, 422). These organized mappings may therefore be used to determine the separation distance, empirically or otherwise, between fibers array 410 and diodes array 402 (or other such, 3-dimensionally spaced systems). Non-contact determination of separation distance is useful in many applications including, for example, robotic control. In some applications, an empirically-developed database and/or theoretical model may be used to determine separation distance in a non-contact way with just one throughput profile being mapped at one Z position rather than calling for a plurality of such mappings at different Z positions.

The above explication of FIG. 4 does not limit perturbation loops to being traced out only over a two-dimensional reference surfaces such as that represented by item 411. It may be understood from the above description regarding separation estimation, that it is within the contemplation of the present disclosure to have perturbation loops being traced out volumetrically (3D) or even in patterns with more dimensions (e.g., an asymmetrical radiation supplying element twists as its moves along a 3D perturbation loop). By way of example, consider a pivotally-mounted telescope having one or more lens which can each be moved along the effective optical axis of the telescope (e.g., for different focusing or other optical effects) at the same time that the telescope end can be controllably swung along various, three-dimensional loop paths. The perturb-and-observe operations of such a telescope (or of another, such fiberless photonic coupling means) can include 3D angular dithering of the whole telescope body in combination with angular and/or transverse dithering of optical components inside the telescope (e.g., movement of a steering lens which is positioned in the focal plane just before the received light is steered to the radiation detector) and/or in combination with angular and/or transverse dithering of the radiation detector. Neural networks or other artificial intelligence means may be taught how to generate adjustment vectors that improve radiation coupling within such multi-dimensional alignment systems.

More specifically, in one embodiment, two telescopes are pointed at each other, for example from rooftop to rooftop across a city so as to provide a fiberless optical connection. Data is transmitted between the two by modulating the light, just as might be done in an optical fiber. (Error correction protocols may vary though because airborne dirt, bugs, etc. can sometimes interfere.) One challenge comes in keeping the telescopes continuously pointed at each despite the presence of misaligning mechanisms such as seismic vibrations, thermal effects, atmospheric effects, windage, and other perturbing mechanisms that can routinely occur during the course of the day (or night). Versions of the above-described alignment algorithms may be used to continuously optimize the mutual pointing of the telescopes to one another. First, using a handshaking protocol, one telescope can be assigned to intentionally dither slightly while the other is held still (to the extent possible). Since, generally, both telescopes are receiving and transmitting optical data signals simultaneously (perhaps interleaving their beams temporally, or by way of polarization or by way of wavelength multiplexing), at any given instant either telescope might serve as the source or the detector of the radiation for purpose of carrying out the alignment-improving algorithm.

Assume one telescope is designated, North, the other South, and it is the North telescope's turn to dither. This can be achieved by rotating the entire unit slightly in altitude and azimuth. Alternatively or additionally a beam steering lens might be used, or a mirror or a prism or another optical beam-steering device might be employed, each individually or in different combinations or sequences, for the purpose of providing dithering across desired dithering reference surfaces (hypothetical such surfaces). The reason that different dithering reference surfaces are used is because the rooftop-to-rooftop situation described has several contributors to misalignment, each with its own dynamics and axes of change. By way of example, diurnal thermal growth of the building heights could be a contributor to misalignment which is a slow and predictable process that repeats each day. Wind and/or vibratory disturbances, on the other hand, tend to have different dynamics and axes of maximum change and they are less predictable and often much shorter in terms of temporal scale. Accordingly it would be beneficial to dither the telescope's altitude and azimuth mount to compensate for thermal growth only occasionally, since it would be a fairly slow action and most appropriate for correcting at gross and cumulative states of pointing error. On the other hand, to compensate for misalignment due to windage or vibrations, a faster dithering of an internal steering lens or perhaps of the detector and/or of the source assembly at the focal plane might be more appropriate since it is correcting for faster, and more random processes such as disturbances from gusts of wind and seismic vibrations. A computing mechanism (e.g., a neural network) may be used to decide which of the plural, dithering and re-alignment mechanisms should be utilize in a given circumstance, with the system perhaps learning from experience (for example by observing repetitive 24 hour thermal cycles). Some of the re-alignment may be of the "feed-forward" type which anticipate expected disturbances and mitigate their effects before system performance significantly is affected. By way of example, an internet connection may feed forward information about changing weather conditions to the rooftop subsystems and each rooftop subsystem can then take appropriate countermeasures to prepare for anticipated changes in wind direction or speed for example.

Figure 5:
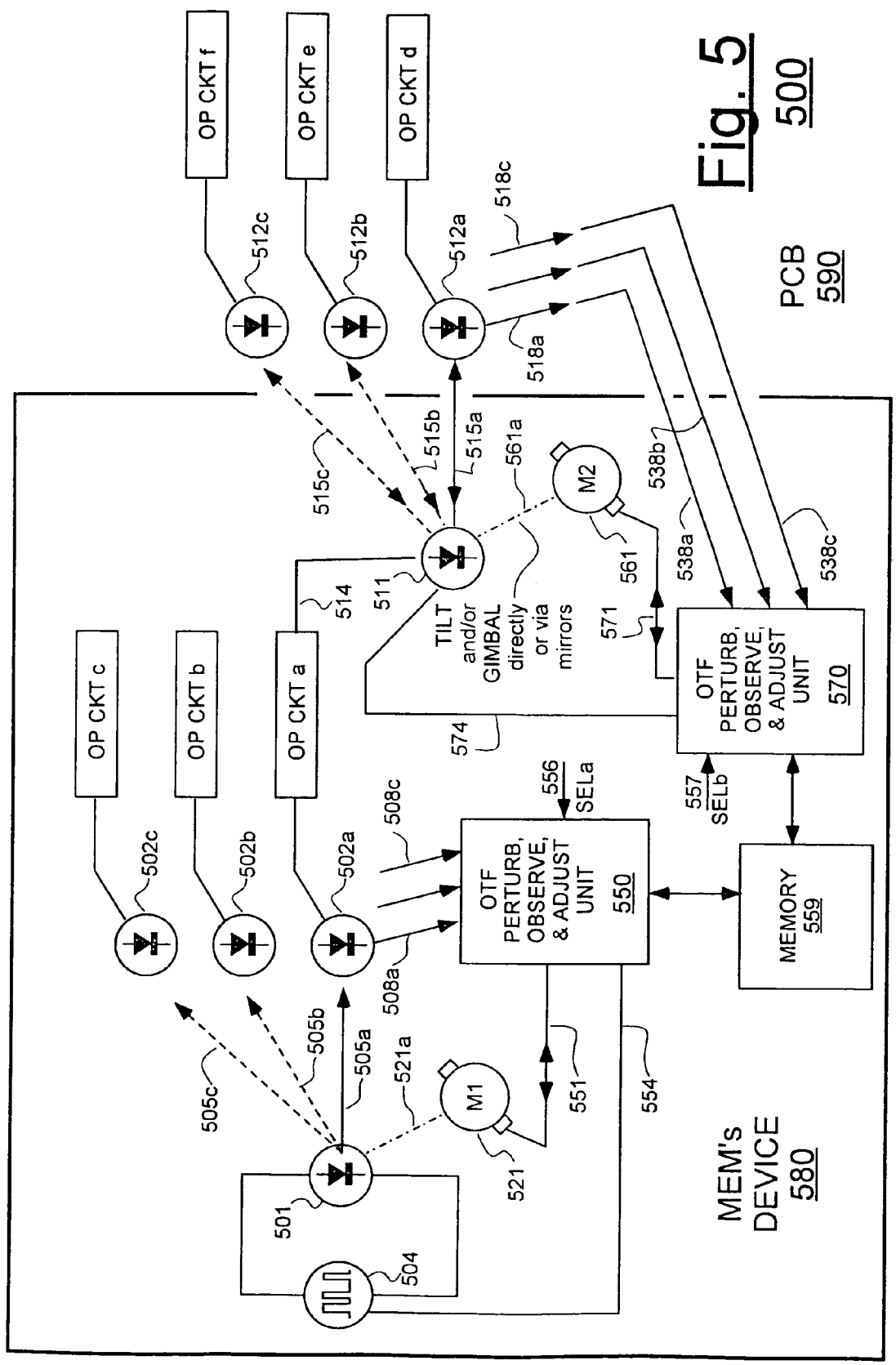
FIG. 5 is a schematic diagram of a third alignment system that may be implemented in accordance with the present disclosure.

FIG. 5 illustrates a system 500 wherein one or more miniaturized electromechanical system devices (MEMS,— or micro-optical electromechanical system devices, MOEMS) 580 are mounted on a printed circuit board (PCB) 590 or a like device-supporting means. A MEMS or MOEMS device such as 580 may include one or more radiation supplying elements such as 501 which can be mechanically tilted, gimbaled or otherwise mechanically manipulated (or even thermally distorted by thermal mechanisms) to thereby intentionally or otherwise direct a correspondingly-controlled radiation energy pattern (e.g., beam 505a) to (or away from) selectable ones of plural radiation-receiving elements such as 502a, 502b, and 502c. The on-MEMS radiation-supplying device can be constituted by any one or more of a translatable, tilt-able or rotatable or gimbal-wise movable (or hexapod maneuvered) mirror or waveguide or light attenuator or light-emitting element. Such a radiation supplying element 501 may be mechanically manipulated by an in-MEMS motor means 521 (M1). The in-MEMS motor means 521 may operate by using one or more forces such as electrostatic, electromagnetic, thermal expansion, piezoelectric, etc. The first motor means (M1) 521 is shown to be coupled by way of link 551 to an integrally-provided on-the-fly (OTF) perturb, observe, and adjust unit 550 which operates in accordance with the principles set forth herein for FIGS. 1, 2A–2D and 3. Connection lines 508a–508c couple the detected reference signals from respective, in-MEMS detectors 502a–502c to the OTF perturb, observe and adjustment control (POAC) unit 550. Detectors 502a–502c are additionally coupled to respective in-MEMS operational circuits, OP-CKTa, OP-CKTb and OP-CKTc as shown. Connection 554 may be used by the OTF-POAC unit 550 for switching signal source 504 between a reference signal generating mode and an operational mode. In response to a supplied selection signal 556 (SELa), the OTF-POAC unit 550 can command the first motor means 521 to mechanically or otherwise manipulate an in-MEMS radiation-supplying source 501 into approximate alignment with one of the correspondingly selectable radiation-receiving elements 502a–502c. The perturb-and-observe mode (POM) is then used by unit 550 for producing an alignment-improving vector signal in accordance with the above principles. The alignment-improving vector signal is then used for adjusting the mechanical state of radiation-supplying element 501 so as to improve its energy coupling with the selected one of the in-MEMS radiation-receiving elements 502a–502c. Once optimal positioning has been obtained, the results may be stored in on-MEMS memory unit 559 for later retrieval and use. Memory unit 559 may store gain values (G) or perturbation loop radii values (R) or other parameters useful for the generation of an adjustment vector 218 as has been described above.

Various drift mechanisms including those based on thermal expansion and contraction may create a need for periodic realignment of radiation supplying element 501 to selected ones of radiation-receiving elements 502a–502c. The integrally-provided OTF-POAC unit 550 of MEMS device 580 may be periodically used for achieving optimal alignment such as for example, during the powering-up of the MEMS device 580 and/or during other appropriate times so as to maintain optimal alignment between radiatively-coupled elements (e.g., 501/502) within the MEMS device even as the temperature or other characteristics of MEMS device 580 change over time (e.g., due to power supply levels, ambient pressure, component aging, exposure to vibrations or other perturbations, etc.).

Optical connections to devices outside of the MEMS device 580 may be similarly implemented by use of a second, in-MEMS, OTF-POAC unit 570 and its associated motor means (M2) 561. Element 511 may be a bidirectional radiation-supplying and -receiving element which communicates with operational circuit OPT-CKTa by way of line 514. Respective paths 515a, 515b, and 515c may represent selectable and free-air couplings between the in-MEMS, element 511 and one or more, MEMS-external, radiation-supplying and/or -receiving units 512a, 512b and 512c. (Although element 511 is shown schematically as a photodetector and/or photo-emitter, it is within the contemplation of the disclosure that element 511 could include simply a movable mirror or a movable fiber or a movable waveguide or a movable lens, or an acousto-optic element or another physical or electro-optic deflecting or redirecting mechanism that steers one or more optical beams, e.g., 515a–515c, between spaced apart, other devices, e.g., OP-CKT's e, f and d. Intensity detection could be provided via a beam splitter (not shown) coupled to such a steering-version of element 511.) The illustrated coupling 574 may be used to selectively switch element 511 between a reference signal mode (for optimizing alignment) and an operational mode (for providing operational communications between the in-MEMS, element 511 and the MEMS-external elements, 512). MEMS-to-external radiative coupling intensities, such as may be detected for example by elements 512a–512c, may be returned to the in-MEMS, OTF-POAC unit 570 by way of respective electrical paths 518a–518c and/or optical paths 538a–538c. These feedback, intensity-indicating signals 518a–518c may be used by the second OTF-POAC unit 570 in optimizing the couplings between the in-MEMS element 511 and the off-MEMS elements 512a–512c. Feedback portions 518a–518c may include electrical communication paths along PCB 590 while portions 538a–538c may include optical communication paths between other MEMS's (not shown) on the PCB and the illustrated MEMS/MOEMS device 580. Alternatively, the feedback from detectors 512a–512c to the second OTF-POAC unit 570 may be entirely by electrical paths.

Just like the first OTF-POAC unit 550, the second on-the-fly perturb, observe and adjustment control unit 570 may store its found optimization positions and/or vector-generating parameters in memory unit 559 for later retrieval. The second OTF-POAC unit 570 may also periodically change the data it stores in memory 559 after having compensated for thermally-caused or other variations in the positions of the off-MEMS elements 512a–512c. Elements 512a–512c may be constantly moving elements which are continuously being tracked by the second OTF-POAC unit 570.

The integrated and active alignment functions provided by OTF-POAC units such as 550 and 590 can advantageously allow for lower energy consumption by radiation-emitting elements (e.g., laser diodes), reduced heating due to inefficient radiation coupling, better signal-to-noise ratios on optical paths, greater communication link lengths between spaced-apart circuits, reduced back-reflections (where the latter could destabilize operations of optical components), reduced crosstalk in multi-channel and/or multi-element systems, and/or increased packing density of such systems. There are many applications which can benefit from such integrated and active alignment of optical (or other radiative) communication links. Examples include the provision of in-office optical links between desktop, laptop and/or PDA-type (personal digital assistant palm-type) computers and provision of inter-office optical links between spaced apart buildings or like structures.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of a first example, it is to be understood that the configuring of an FPGA, DSP or like programmable logic device (PLD, e.g., 390 of FIG. 3) in accordance with the disclosure can include use of a computer to define the configuration data for configuring the PLD. FIG. 6A is a perspective view of a computer structured in accordance with the disclosure for either carrying out the OTF perturb-and-observe mode (POM) and/or adjustment execution mode (AEM) itself or for configuring a programmable logic device (e.g., FPGA) to instead carry out one or both of the POM and AEM. A computerized system in accordance with the disclosure can include use of a computer (e.g., 600 of FIGS. 6A–6B) to provide for one or both of the OTF perturb-and-observe mode (POM) and adjustment execution mode (AEM). A computer-readable medium (e.g., 675) or another form of a software product or machine-instructing means (including but not limited to, a hard disk (670), a compact disk, a flash memory stick, a downloading of manufactured instructing signals over a network (e.g., 690) and/or like software products) may be used for instructing an instructable machine (e.g., CPU 650) to carry out the OTF-POM and/or AEM modes directly in response to program code 665; or to instead configure a programmable logic device (e.g., FPGA 601) to instead carry out one or both of the POM and AEM algorithms by transferring appropriate configuration signals which can be loaded via a programming device (802). As such, it is within the scope of the disclosure to have an instructable machine carry out, and/to provide a software product adapted for causing an instructable machine to carry out a machine-implemented methods including the OTF-POM and AEM algorithms.

As seen in the exemplary desktop view 611 that is displayed on display means 610 of FIG. 6A, a computer user may be given the options of selecting via a mouse 640 or by other input means (630, 614): (1) what perturb loop drive signals (e.g., 355) are to be used for driving a perturbation loop creating, motor means (e.g., 321 of FIG. 3); (2) what trigger levels are to be used for intensity capturing, trigger circuits such as 309 and 349 of FIG. 3; (3) what inverse function (358) to use for generating the $\phi_{obsd}$ signal; and (4) what vector-producing function (e.g., $f_3(\ )$ of Eq. 3) to use and/or what initial gain or other parameters to use for generating the adjustment vector signal (356).

FIG. 6B is a block diagram showing an organization that may be used for the computer of FIG. 6A and showing how manufactured instructing signals may be introduced into an instructable portion of the computer for causing the computer to effect the carrying out of the OTF perturb-and-observe mode (POM) and adjustment execution mode (AEM). Such manufactured instructing signals 665 may be introduced partially or wholly by way of a network connection 690 or a removable, computer readable medium 675 for storage in a system memory of the computer 600 or for programming by way of PLD programmer 602' into an FPGA 601 or another PLD or DSP device or even into a programmable MEMS device which may be 580 of FIG. 5.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. An alignment method comprising:
   (a) during a given sampling session and while a radiation supplying and/or receiving, first element moves along a dithering displacement path which extends adjacent to an initial position of the first element and while a radiation signal couples radiatively between the first element and a radiation supplying and/or receiving, second element, obtaining first samples of an energy detection signal that represents radiative coupling efficiency between the first and second elements;
   (b) respectively identifying amongst the obtained first samples, a corresponding current one or two of the first samples that is/are respectively and currently representative of a greatest or a least coupling efficiency among the first samples taken during the given sampling session;
   (c) obtaining second samples of a position indicating signal that represents positional advancements of the first element along the dithering displacement path, relative to its initial position and during the given sampling session;
   (d) associating at least a respective one or two of the second samples with the corresponding one or two of the first samples that is/are respectively and currently representative of the greatest and least coupling efficiency among the first samples taken during the given sampling session so that corresponding positions of the first element, relative to its initial position can be determined at least approximately for the corresponding states in which the first samples of currently greatest and least coupling efficiency were obtained;
   (e) wherein the first samples are obtained opportunistically as conditions present themselves for obtaining the samples of the energy detection signal that can represent different radiative coupling efficiencies between the first and second elements, and as conditions present themselves for obtaining associatable samples of the position indicating signal.

2. The alignment method of claim 1 and further comprising:
   (f) producing an alignment improving vector signal from information defined by at least one pair of the following two pairs of first and second samples:
      (f.1) the identified first sample that has been identified as representing the greatest of the energy coupling efficiencies detected from the given sampling session and the corresponding second sample associated with said, identified as greatest, first sample; and
      (f.2) the identified first sample that has been identified as representing the smallest of the energy coupling efficiencies detected during the given sampling session and the corresponding second sample associated with said, identified as smallest, first sample.

3. The alignment method of claim 2 wherein:
   (f.3) said optimization vector signal represents at least one of an adjustment movement direction to be taken when moving the first element from its initial position toward an improved-alignment position associated with improved coupling efficiency, and an adjustment movement distance to be traveled when moving the first element from its initial position toward the improved-alignment position.

4. An alignment improving method comprising:
(a) moving a radiation supplying and/or receiving, first element along a dithering displacement path which extends adjacent to an initial position of the first element;
(b) causing at least part of a reference radiation signal to couple radiatively between the first element and a radiation supplying and/or receiving, second element that is radiatively couplable to the first element;
(c) taking first samples of energy detections made by at least one of the first and second elements of the radiatively coupled portions of the reference radiation signal while said first element is moving along the dithering displacement path;
(d) respectively identifying amongst the first samples, a corresponding current one or two of the first samples that is/are respectively and currently a greatest or a least of the first samples taken during a given sampling session;
(e) taking second samples of an advancement signal that represents advancements of the first element along the dithering displacement path, the advancements being relative to said initial position, where said second samples correspond to respective advancement positions of the first element when the first element is detecting the energy coupling that is identified by the identifying step (d) as being currently a greatest or a least one of the energy coupling detections made by the at least one of the first and second elements;
(f) producing an optimization vector signal from information defined by at least two of:
  (f.1) the initial position of the first element;
  (f.2) the identified first sample that has been identified as representing the greatest of the energy coupling detections made during the given sampling session and the corresponding second sample associated with said, identified as greatest, first sample; and
  (f.3) the identified first sample that has been identified as representing the smallest of the energy coupling detections made during the given sampling session and the corresponding second sample associated with said, identified as smallest, first sample,
  (f.4) wherein said optimization vector signal represents at least one of an adjustment movement direction to be taken when moving the first element from its initial position toward an improved-alignment position, and an adjustment movement distance to be traveled when moving the first element from its initial position toward the improved-alignment position.

5. The alignment improving method of claim 4 and further comprising:
(g) moving the first element in accordance with the optimization vector signal.

6. The alignment improving method of claim 4 wherein:
(a.1) said moving of the first element along the dithering displacement path utilizes a motor means that operates on the basis of at least one of: piezoelectric-induced forces, magnetostrictive-induced forces, electrostatically-induced forces, electromagnetically-induced forces, thermal-strain induced forces, pneumatic forces, hydraulic forces and magnetic forces; and
(g.1) said moving of the first element to an improved alignment position utilizes a motor means that operates on the basis of at least one of: electrostatically-induced forces, electromagnetically-induced forces, thermal-strain induced forces, pneumatic forces, hydraulic forces and magnetic forces.

7. The alignment improving method of claim 4 wherein:
(a.1) said dithering displacement path is a perturbation loop that completely surrounds the initial position of the first element and said moving of the first element includes cycling the first element around the perturbation loop.

8. The alignment improving method of claim 7 wherein:
(e.1) said advancement signal represents angular positions of the first element around the perturbation loop.

9. The alignment improving method of claim 7 wherein:
(a.2) said cycling the first element around the perturbation loop includes continuous movements around the perturbation loop; and
(c.1) said taking of the first samples includes taking of on-the-fly samples while the first element is engaged in a continuous movement around the perturbation loop.

10. A machine-implemented method for extending a first optical alignment enhancing operation, where the first optical alignment enhancing operation includes:
(0.1) moving a first element along a dithering displacement path;
(0.2) taking first samples of energy detections made by at least the first element or a complementary second element, where the energy detections represent coupling efficiencies of radiatively coupled portions of a reference radiation signal being passed between the first and second elements;
(0.3) identifying amongst the first samples, a corresponding current one or two of the first samples that is/are respectively and currently representative of a greatest or a least coupling efficiency for the first samples taken during a corresponding sampling session;
(0.4) taking second samples of an advancement signal that represents positional advancements of the first element along the dithering displacement path, where the represented positional advancements are relative to said initial position, where said second samples correspond to respective advancement positions of the first element when the first element is detecting the energy coupling that is identified by the identifying step (0.3) as being currently a greatest or a least one of the energy coupling detections made by the at least one of the first and second elements;
(0.5) producing a first optimization vector signal from information defined by at least the last two of:
  (0.5a) the initial position of the first element;
  (0.5b) the identified first sample that has been identified as representing the greatest of the energy coupling detections made during the corresponding sampling session and the corresponding second sample associated with said, identified as greatest, first sample; and
  (0.5c) the identified first sample that has been identified as representing the smallest of the energy coupling detections made during the given sampling session and the corresponding second sample associated with said, identified as smallest, first sample;
  (0.5d) wherein said first optimization vector signal is used by said first optical alignment enhancing operation to define both an adjustment movement direction taken when moving the first element from its initial position toward an improved-alignment position, and an adjustment movement distance to be traveled when moving the first element from its initial position toward the improved-alignment position; and wherein said machine-implemented extension method comprises:
(a) either at the end of the adjustment movement of said first optical alignment enhancing operation or during a minor end part of said adjustment movement, taking a further sample of the energy detections made by said one or the other of the first and second elements;
(b) determining if the radiative coupling efficiency represented by the further sample is greater than the radiative coupling efficiency represented by the identified first sample ($I_{maxc}$) that was used for producing the first optimization vector signal; and
(c) automatically extending the adjustment movement distance to be traveled by the first element is said determining step indicates that the radiative coupling efficiency represented by the further sample exceeds the radiative coupling efficiency represented by the identified first sample ($I_{maxc}$) by a predefined amount.

11. A machine-implemented method for determining if a second radiative influence coupling state is available that provides a more desirable coupling of radiative influence than is provided by a, current first radiative influence coupling state, the method comprising:
(a) while at least one of first and second radiatively cross-influencing elements is dithering about a respective current position or about a respective current movement track in a given sampling run, taking samplings of an influence representing signal that represents a radiatively coupled influence between the first and second elements;
(b) comparing the taken samplings against one or more of recorded value signals where the recorded value signals include at least one of:
   (b.1) a first recorded value signal representing a largest radiatively coupled influence that has been sampled in the given sampling run; and
   (b.2) a second recorded value signal representing a smallest, non-negligible radiatively coupled influence that has been sampled in the given sampling run;
(c) recording a given one of the taken and compared samplings as the latest first recorded value signal if said comparing indicates it is larger than the corresponding and pre-comparison, first pre-recorded value signal, and/or recording the given one of the taken and compared samplings as the latest second recorded value signal if said comparing indicates it is smaller than the corresponding and pre-comparison, second recorded value signal;
(d) additionally recording a corresponding position-indicating signal for the given one of the taken and compared samplings if said comparing indicates it is larger than the corresponding and pre-comparison, first recorded value signal, and/or if said comparing indicates it is smaller than the corresponding and pre-comparison, second recorded value signal; and
(e) using one or more of the first and second recorded value signals and one or more of the recorded position-indicating signals to determine if there exists a different position or different movement track that provides a more desirable coupling of radiative influence than is provided by a, current radiative influence coupling state associated with the current position or current movement track.

12. The machine-implemented determining method of claim 11 wherein said radiative influence coupling states are selected from the group consisting of:
states in which electromagnetic radiation is radiatively coupled;
states in which electrostatic force is radiatively coupled;
states in which magnetic force is radiatively coupled;
states in which atomic attraction force is radiatively coupled; and
states in which energy is radiatively coupled with a tunable cavity.

13. The machine-implemented determining method of claim 11 wherein said dithering is selected from the dithering movement group consisting of:
(a.1) a back and forth dithering about the current position or non-parallel to the respective current movement track;
(a.2) a looping about the current position or across the respective current movement track;
(a.3) a criss-crossing about the current position or a zig-zag about the respective current movement track;
(a.4) a natural perturbation path of one of the first and second elements;
(a.5) a cloverleaf pattern; and
(a.6) a Lissajous pattern.

14. The machine-implemented determining method of claim 11 wherein said using of one or more of the first and second recorded value signals and one or more of the recorded position-indicating signals includes:
(e.1) determining a difference between the first and second recorded value signals.

15. The machine-implemented determining method of claim 11 wherein said using of one or more of the first and second recorded value signals and one or more of the recorded position-indicating signals includes:
(e.1) determining a correction direction associated with at least one of said first and second recorded value signals.

16. The machine-implemented determining method of claim 15 and further wherein:
(e.1a) said determining of the correction direction utilizes respective first and second directional signals associated respectively with said first and second recorded value signals.

17. The machine-implemented determining method of claim 15 and further wherein said using of one or more of the first and second recorded value signals and one or more of the recorded position-indicating signals includes:
(e.2) determining a difference between the first and second recorded value signals.

18. The machine-implemented determining method of claim 17 and further wherein said using of one or more of the first and second recorded value signals and one or more of the recorded position-indicating signals includes:
(e.3) generating a correction vector signal that corresponds to a correction towards the different position or movement track that provides the more desirable coupling of radiative influence.

19. The machine-implemented determining method of claim 11 and further comprising:
(f) randomizing the taking of at least one of said samplings of the influence representing signal.

20. The machine-implemented determining method of claim 11 and further comprising:
(f) further using said determination of the existence of a different position or a different movement track to alter the behavior of an alignment system.

21. The machine-implemented determining method of claim 20 wherein said alignment system is part of at least one member of the group consisting of:

(f.1) a radiative influence-wise coupled telecommunications systems;

(f.2) a curing system for curing an epoxy or another element affixing material;

(f.3) a positioning system for positioning two or more members relative to one another; and (f.4) a tracking system for tracking the movement of an object.

22. A machine-implemented method of identifying within a bounded positional domain, a first position having a desired coupling thereto of radiative influence from among a plurality of positions in the bounded positional domain, where the plurality of positions have respective radiative influences coupled thereto as functions of their respective positions, the identifying method comprising:

(a) taking samplings of plural influence representing signals that respectively represent radiatively coupled influences at different ones of said plurality of positions, where each sampling is logically associated to its respective one of the different positions and wherein said samplings are not obtained by use of a physical looping motion around a path that is controlled to be a regular geometric figure and by physical stopping at pre-specified points along that controlled path;

(b) comparing the taken samplings of at least two different positions and determining if one of the compared samplings has a more desirable coupling of radiative influence associated therewith than one or more others of the compared samplings, where the said more desirable coupling is defined by a member of the group consisting of a stronger radiative influence and a weaker radiative influence; and (c) defining a positional vector passing through a position of maximally desirable coupling as found or computed along a comparison boundary defined by the positions of the compared samplings compared in said comparing step (b).

* * * * *